(12) United States Patent
Periyalwar et al.

(10) Patent No.: US 9,042,882 B2
(45) Date of Patent: May 26, 2015

(54) METHODS TO ENABLE EFFICIENT USE OF MULTIPLE RADIO ACCESS TECHNOLOGIES

(75) Inventors: Shalini Periyalwar, Waterloo (CA); Mark Pecen, Waterloo (CA); David G. Steer, Nepean (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/636,483

(22) PCT Filed: Aug. 4, 2011

(86) PCT No.: PCT/CA2011/050477
§ 371 (c)(1),
(2), (4) Date: Sep. 21, 2012

(87) PCT Pub. No.: WO2013/016798
PCT Pub. Date: Feb. 7, 2013

(65) Prior Publication Data
US 2014/0148152 A1 May 29, 2014

(51) Int. Cl.
*H04W 4/00* (2009.01)
*H04W 76/02* (2009.01)
(Continued)

(52) U.S. Cl.
CPC ............ *H04W 76/02* (2013.01); *H04W 76/025* (2013.01); *H04W 88/06* (2013.01); *H04W 80/00* (2013.01)

(58) Field of Classification Search
CPC . H04W 88/06; H04W 36/14; H04W 36/0022; H04W 48/18; H04W 72/082; H04W 72/02; H04W 72/04; H04W 36/0061; H04W 36/08; H04W 40/04; H04W 60/005

USPC ....................................................... 455/426.1
See application file for complete search history.

(56) References Cited

U.S. PATENT DOCUMENTS 6,996,061 B2  2/2006  Yang et al.
8,400,988 B2  3/2013  Liu et al.
(Continued)

FOREIGN PATENT DOCUMENTS

WO    2006012018 A1    2/2006

OTHER PUBLICATIONS

International Preliminary Report on Patentability for PCT Application No. PCT/CA2011/050476, mailed Feb. 13, 2014, 6 pages.
(Continued)

*Primary Examiner* — Kwasi Karikari
(74) *Attorney, Agent, or Firm* — Conley Rose, P.C.; J. Robert Brown, Jr.

(57) ABSTRACT

A device and method are provided for concurrently using a plurality of radio access technologies (RATs) to support a wireless-enabled communications session. A set of data is processed at a client node to identify a subset of priority data. The set of data and the subset of priority data are respectively provided to a first and second protocol stack, which correspond to a first and second RAT. The first and second protocol stacks are then used to control the transmission of a first and second set of transmitted data, which in turn respectively comprise the set of data and the subset of priority data. The first and second sets of transmitted data are received by an access node, which uses corresponding first and second protocol stacks to control their reception. The first and second sets of transmitted data are then processed to generate a set of received data.

30 Claims, 7 Drawing Sheets

(51) Int. Cl.
*H04W 88/06* (2009.01)
*H04W 80/00* (2009.01)

(56) References Cited

U.S. PATENT DOCUMENTS

| | | |
|---|---|---|
| 2006/0068777 A1 | 3/2006 | Sadowsky et al. |
| 2006/0084469 A1 | 4/2006 | Malone et al. |
| 2006/0111045 A1 | 5/2006 | Orlassino et al. |
| 2007/0206529 A1 | 9/2007 | Liu et al. |
| 2008/0219281 A1 | 9/2008 | Akin et al. |
| 2009/0207820 A1 | 8/2009 | Dimou |
| 2011/0228750 A1 | 9/2011 | Tomici et al. |
| 2012/0106509 A1* | 5/2012 | Klingenbrunn et al. ...... 370/331 |
| 2012/0250548 A1* | 10/2012 | Swaminathan et al. ...... 370/252 |
| 2012/0289170 A1 | 11/2012 | Li et al. |
| 2014/0153489 A1 | 6/2014 | Perras et al. |

OTHER PUBLICATIONS

International Search Report and Written Opinion dated Jan. 26, 2012 for PCT Application No. PCT/CA2011/050476, 8 pages.
International Preliminary Report on Patentability for PCT Application PCT/CA2011/050477, mailed Feb. 13, 2014, 7 pages.
International Search Report dated Mar. 23, 2012 for Application No. PCT/CA2011/050477.
Periyalwar, Shalini, et al.; U.S. Appl. No. 13/636,480, filed Sep. 21, 2012; Title: Methods to Enable Efficient Use of Multiple Radio Access Technologies.
Office Action dated Jul. 31, 2014; U.S. Appl. No. 13/636,480, filed Sep. 21, 2012; 20 pages.
Notice of Allowance dated Dec. 5, 2014; U.S. Appl. No. 13/636,480, filed Sep. 21, 2012; 13 pages.
Notice of Allowance dated Mar. 18, 2015; U.S. Appl. No. 13/636,480, filed Sep. 21, 2012; 16 pages.

* cited by examiner

METHODS TO ENABLE EFFICIENT USE OF MULTIPLE RADIO ACCESS TECHNOLOGIES

CROSS-REFERENCE TO RELATED APPLICATIONS

This is a U.S. National Stage of International Application No. PCT/CA2011/050477, entitled "METHODS TO ENABLE EFFICIENT USE OF MULTIPLE RADIO ACCESS TECHNOLOGIES", filed Aug. 4, 2011, which is incorporated by reference in its entirety.

BACKGROUND

It is not uncommon for today's wireless devices to have multiple transceivers, each of which supports a different Radio Access Technology (RAT). Some of such RATs include Global System for Mobile Communications/General Packet Radio Service (GSM/GPRS), Universal Mobile Telecommunications System (UMTS), and WiFi. Likewise, it is not uncommon to find overlapping coverage areas that support multiple RATs operating on widely-separated carrier frequencies. In such areas, wireless devices equipped with multiple radios are able to access multiple RAT networks, and to also choose between them.

However, various RATs currently operate independently in today's wireless-enabled communications environment. For example, a user of a multi-radio wireless device may selectively elect to operate either in a WiFi mode or in a cellular mode, but cannot combine both for a common service, even if both RATs are available at the user's location. Furthermore, a radio signal associated with each RAT may experience uncorrelated, high-variability in link quality due to propagation loss, fading and interference.

While radio link quality is generally robust for most types of applications ranging from delay-sensitive to delay-tolerant, it is not uncommon to experience outages, manifested by dropped calls or transmission errors. Moreover, it is not currently possible to achieve greater reliability of the radio link by introducing greater redundancy in the transmitted signal due to limitations imposed by the wireless channel characteristics (e.g., the channel impairments are likely to be correlated). As a result, the level of achievable reliability is limited when using a single radio link.

BRIEF DESCRIPTION OF THE DRAWINGS

The present disclosure may be understood, and its numerous objects, features and advantages obtained, when the following detailed description is considered in conjunction with the following drawings, in which.

DETAILED DESCRIPTION

Figure 1:
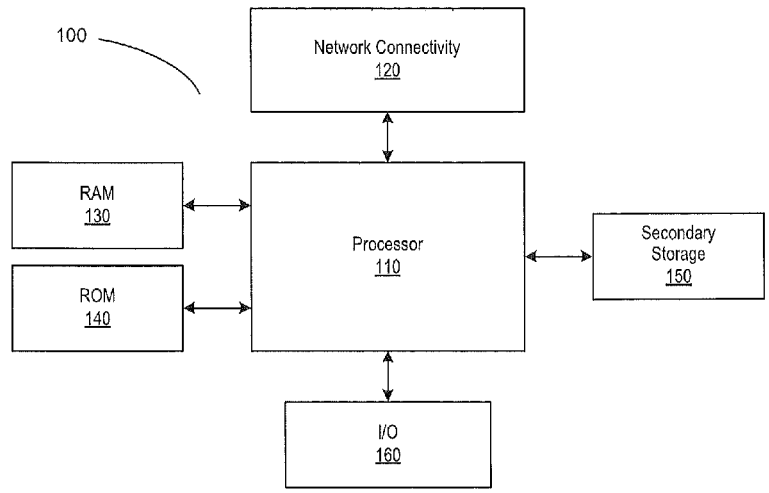
FIG. 1 depicts an exemplary system in which the present disclosure may be implemented.

The present disclosure is directed in general to communications systems and methods for operating same. In one aspect, the present disclosure relates to devices and methods for concurrently using a plurality of radio access technologies in a wireless-enabled communications environment to support a communications session.

An embodiment is directed to a network node, comprising first and second communication links comprising, respectively, a first radio configured to use a first Radio Access Technology (RAT) and a second radio configured to use a second RAT, a first protocol stack corresponding to said first RAT, a second protocol stack corresponding to said second RAT, a processing logic configured to use said first protocol stack to control the reception of a first set of transmitted data, said reception performed by said first radio, use said second protocol stack to control the reception of a second set of transmitted data, said reception performed by said second radio, and process said first and second sets of transmitted data to generate a set of received data, said second set of transmitted data comprising a subset of said first set of transmitted data.

An embodiment is directed to a method for managing the concurrent reception of data, comprising using an network node comprising a first radio configured to use a first Radio Access Technology (RAT) and a second radio configured to use a second RAT, using a first protocol stack corresponding to said first RAT and a second protocol stack corresponding to said second RAT, using a processing logic configured to use said first protocol stack to control the reception of a first set of transmitted data, said reception performed by said first radio, use said second protocol stack to control the reception of a second set of transmitted data, said reception performed by said second radio, and process said first and second sets of transmitted data to generate a set of received data, said second set of transmitted data comprising a subset of said first set of transmitted data.

A device and method are provided for concurrently using a plurality of radio access technologies in a wireless-enabled communications environment to support a communications session. In various embodiments, an Inter-Radio Access Technology (RAT) Supervisory Layer (IRSL) is implemented with a first and second protocol stack corresponding to a first and second RAT, which in turn corresponds to a first and second radio. In these and other embodiments, the IRSL is implemented at a client node and a network node, wherein the network node can constitute an access node, each of which comprise a first and second radio respectively configured to use the first and second RAT or at some intermediate node or server in the communication link beyond the access node.

In one embodiment, a set of data is processed at the client node to identify a subset of priority data. The IRSL implemented at the client node provides the set of data to the first protocol stack and the corresponding subset of priority data to the second protocol stack. The first and second protocol stacks are then respectively used to control the transmission of a first and second set of transmitted data, which respectively comprise the set of data and the subset of priority data. The first and second sets of transmitted data are then respectively received by the corresponding first and second radios of the access node. In turn, the IRSL implemented at the access node uses the corresponding first and second protocol stacks to control the reception of the first and second sets of transmitted data. The first and second sets of transmitted data are then processed to generate a set of received data.

In one embodiment, the first set of transmitted data comprises a first information element (IE) corresponding to the set of data and the first RAT. In another embodiment, the second set of transmitted data comprises the first IE and a second IE corresponding to the subset of priority data and the second RAT. In various embodiments, the IRSL is configured to provide the set of data to a predetermined layer of the first protocol stack and provide the subset of priority data to a predetermined layer of the second protocol stack. In one embodiment, the IRSL is configured to operate above the RAT-specific radio layers of the first and second protocol stacks and below a RAT-agnostic layer of the first protocol stack. In another embodiment, the IRSL is configured to operate above the transport layer of the first and second protocol stacks and below a RAT-agnostic layer of the first protocol stack. In yet another embodiment, the IRSL is configured to operate below the transport layer of the first protocol stack and above the RAT-specific lower radio layers of the first and second protocol stacks. In various embodiments, the first and second RATs are different and are associated with the same communications provider. In various other embodiments, the first and second RATs are the same and are associated with different communications providers. In various other embodiments, the first and second RATs are different and may be associated with the same communications provider.

Various illustrative embodiments of the present disclosure will now be described in detail with reference to the accompanying figures. While various details are set forth in the following description, it will be appreciated that the present disclosure may be practiced without these specific details, and that numerous implementation-specific decisions may be made to the disclosure described herein to achieve specific goals, such as compliance with process technology or design-related constraints, which will vary from one implementation to another. While such a development effort might be complex and time-consuming, it would nevertheless be a routine undertaking for those of skill in the art having the benefit of this disclosure. For example, selected aspects are shown in block diagram and flowchart form, rather than in detail, in order to avoid limiting or obscuring the present disclosure. In addition, some portions of the detailed descriptions provided herein are presented in terms of algorithms or operations on data within a computer memory. Such descriptions and representations are used by those skilled in the art to describe and convey the substance of their work to others skilled in the art.

As used herein, the terms "component," "system" and the like are intended to refer to a computer-related entity, either hardware, software, a combination of hardware and software, or software in execution. For example, a component may be, but is not limited to being, a processor, a process miming on a processor, an object, an executable instruction sequence, a thread of execution, a program, or a computer. By way of illustration, both an application running on a computer and the computer itself can be a component. One or more components may reside within a process or thread of execution and a component may be localized on one computer or distributed between two or more computers.

As likewise used herein, the term "node" broadly refers to a connection point, such as a redistribution point or a communication endpoint, of a communication environment, such as a network. Accordingly, such nodes refer to an active electronic device capable of sending, receiving, or forwarding information over a communications channel. Examples of such nodes include data circuit-terminating equipment (DCE), such as a modem, hub, bridge or switch, and data terminal equipment (DTE), such as a handset, a printer or a host computer (e.g., a router, workstation or server). Examples of local area network (LAN) or wide area network (WAN) nodes include computers, packet switches, cable modems, Data Subscriber Line (DSL) modems, and wireless LAN (WLAN) access points. Examples of Internet or Intranet nodes include host computers identified by an Internet Protocol (IP) address, bridges and WLAN access points. Likewise, examples of nodes in cellular communication include base stations, relays, base station controllers, radio network controllers, home location registers (HLR), visited location registers (VLR), Gateway GPRS Support Nodes (GGSN), Serving GPRS Support Nodes (SGSN), Serving Gateways (S-GW), and Packet Data Network Gateways (PDN-GW).

Other examples of nodes include client nodes, server nodes, peer nodes and access nodes. As used herein, a client node may refer to wireless devices such as mobile telephones, smart phones, personal digital assistants (PDAs), handheld devices, portable computers, tablet computers, and similar devices or other user equipment (UE) that has telecommunications capabilities. Such client nodes may likewise refer to a mobile, wireless device, or alternatively, to devices that have similar capabilities that are not generally transportable, such as desktop computers, set-top boxes, or sensors. A network node, as used herein, generally includes all nodes with the exception of client nodes, server nodes and access nodes. Likewise, a server node, as used herein, refers to an information processing device (e.g., a host computer), or series of information processing devices, that perform information processing requests submitted by other nodes. As likewise used herein, a peer node may sometimes serve as client node, and at other times, a server node. In a peer-to-peer or overlay network, a node that actively routes data for other networked devices as well as itself may be referred to as a supernode.

An access node, as used herein, refers to a node that provides a client node access to a communication environment. Examples of access nodes include cellular network base stations and wireless broadband (e.g., WiFi, WiMAX, etc) access points, which provide corresponding cell and WLAN coverage areas. As used herein, a macrocell is used to generally describe a traditional cellular network cell coverage area. Such macrocells are typically found in rural areas, along highways, or in less populated areas. As likewise used herein, a microcell refers to a cellular network cell with a smaller coverage area than that of a macrocell. Such micro cells are typically used in a densely populated urban area. Likewise, as used herein, a picocell refers to a cellular network coverage area that is less than that of a microcell. An example of the coverage area of a picocell may be a large office, a shopping mall, or a train station. A femtocell, as used herein, currently refers to the smallest commonly accepted area of cellular network coverage. As an example, the coverage area of a femtocell is sufficient for homes or small offices.

In general, a coverage area of less than two kilometers typically corresponds to a microcell, 200 meters or less for a picocell, and on the order of 10 meters for a femtocell. The actual dimensions of the cell may depend on the radio frequency of operation, the radio propagation conditions and the density of communications traffic. As likewise used herein, a client node communicating with an access node associated with a macrocell is referred to as a "macrocell client." Likewise, a client node communicating with an access node associated with a microcell, picocell, or femtocell is respectively referred to as a "microcell client," "picocell client," or "femtocell client."

The term "article of manufacture" (or alternatively, "computer program product") as used herein is intended to encompass a computer program accessible from any computer-readable device or media. For example, computer readable media can include but are not limited to magnetic storage devices (e.g., hard disk, floppy disk, magnetic strips, etc.), optical disks such as a compact disk (CD) or digital versatile disk (DVD), smart cards, and flash memory devices (e.g., card, stick, etc.).

The word "exemplary" is used herein to mean serving as an example, instance, or illustration. Any aspect or design described herein as "exemplary" is not necessarily to be construed as preferred or advantageous over other aspects or designs. Those of skill in the art will recognize many modifications may be made to this configuration without departing from the scope, spirit or intent of the claimed subject matter. Furthermore, the disclosed subject matter may be implemented as a system, method, apparatus, or article of manufacture using standard programming and engineering techniques to produce software, firmware, hardware, or any combination thereof to control a computer or processor-based device to implement aspects detailed herein.

FIG. 1 illustrates an example of a system 100 suitable for implementing one or more embodiments disclosed herein. In various embodiments, the system 100 comprises a processor 110, which may be referred to as a central processor unit (CPU) or digital signal processor (DSP), network connectivity interfaces 120, random access memory (RAM) 130, read only memory (ROM) 140, secondary storage 150, and input/output (I/O) devices 160. In some embodiments, some of these components may not be present or may be combined in various combinations with one another or with other components not shown. These components may be located in a single physical entity or in more than one physical entity. Any actions described herein as being taken by the processor 110 might be taken by the processor 110 alone or by the processor 110 in conjunction with one or more components shown or not shown in FIG. 1.

The processor 110 executes instructions, codes, computer programs, or scripts that it might access from the network connectivity interfaces 120, RAM 130, or ROM 140. While only one processor 110 is shown, multiple processors may be present. Thus, while instructions may be discussed as being executed by a processor 110, the instructions may be executed simultaneously, serially, or otherwise by one or multiple processors 110 implemented as one or more CPU chips.

In various embodiments, the network connectivity interfaces 120 may take the form of modems, modem banks, Ethernet devices, universal serial bus (USB) interface devices, serial interfaces, token ring devices, fiber distributed data interface (FDDI) devices, wireless local area network (WLAN) devices (including radio, optical or infra-red signals), radio transceiver devices such as code division multiple access (CDMA) devices, global system for mobile communications (GSM) radio transceiver devices, long term evolution (LTE) radio transceiver devices, worldwide interoperability for microwave access (WiMAX) devices, and/or other well-known interfaces for connecting to networks, including Personal Area Networks (PANs) such as Bluetooth. These network connectivity interfaces 120 may enable the processor 110 to communicate with the Internet or one or more telecommunications networks or other networks from which the processor 110 might receive information or to which the processor 110 might output information.

The network connectivity interfaces 120 may also be capable of transmitting or receiving data wirelessly in the form of electromagnetic waves, such as radio frequency signals or microwave frequency signals. Information transmitted or received by the network connectivity interfaces 120 may include data that has been processed by the processor 110 or instructions that are to be executed by processor 110. The data may be ordered according to different sequences as may be desirable for either processing or generating the data or transmitting or receiving the data.

In various embodiments, the RAM 130 may be used to store volatile data and instructions that are executed by the processor 110. The ROM 140 shown in FIG. 1 may likewise be used to store instructions and data that is read during execution of the instructions. The secondary storage 150 is typically comprised of one or more disk drives or tape drives and may be used for non-volatile storage of data or as an overflow data storage device if RAM 130 is not large enough to hold all working data. Secondary storage 150 may likewise be used to store programs that are loaded into RAM 130 when such programs are selected for execution. The I/O devices 160 may include liquid crystal displays (LCDs), Light Emitting Diode (LED) displays, Organic Light Emitting Diode (OLED) displays, projectors, televisions, touch screen displays, keyboards, keypads, switches, dials, mice, track balls, voice recognizers, card readers, paper tape readers, printers, video monitors, or other well-known input/output devices.

Figure 2:
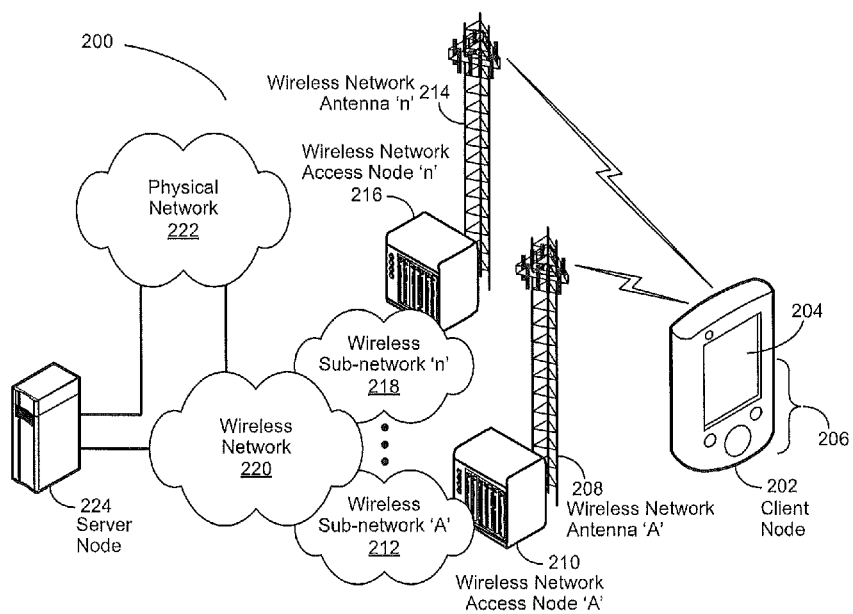
FIG. 2 shows a wireless-enabled communications environment including an embodiment of a client node.

FIG. 2 shows a wireless-enabled communications environment including an embodiment of a client node as implemented in an embodiment of the disclosure. Though illustrated as a mobile phone, the client node 202 may take various forms including a wireless handset, a pager, a smart phone, or a personal digital assistant (PDA). In various embodiments, the client node 202 may also comprise a portable computer, a tablet computer, a laptop computer, or any computing device operable to perform data communication operations. Many suitable devices combine some or all of these functions. In some embodiments, the client node 202 is not a general purpose computing device like a portable, laptop, or tablet computer, but rather is a special-purpose communications device such as a telecommunications device installed in a vehicle. The client node 202 may likewise be a device, include a device, or be included in a device that has similar capabilities but that is not transportable, such as a desktop computer, a set-top box, or a network node. In these and other embodiments, the client node 202 may support specialized activities such as gaming, inventory control, job control, task management functions, and so forth.

In various embodiments, the client node 202 includes a display 204. In these and other embodiments, the client node 202 may likewise include a touch-sensitive surface, a keyboard or other input keys 206 generally used for input by a user. The input keys 206 may likewise be a full or reduced alphanumeric keyboard such as QWERTY, Dvorak, AZERTY, and sequential keyboard types, or a traditional numeric keypad with alphabet letters associated with a telephone keypad. The input keys 206 may likewise include a trackwheel, an exit or escape key, a trackball, and other navigational or functional keys, which may be inwardly depressed to provide further input function. The client node 202 may likewise present options for the user to select, controls for the user to actuate, and cursors or other indicators for the user to direct.

The client node 202 may further accept data entry from the user, including numbers to dial or various parameter values for configuring the operation of the client node 202. The client node 202 may further execute one or more software or firmware applications in response to user commands. These applications may configure the client node 202 to perform various customized functions in response to user interaction. Additionally, the client node 202 may be programmed or configured over-the-air (OTA), for example from a wireless network access node 'A' 210 through 'n' 216 (e.g., a base station), a server node 224 (e.g., a host computer), or a peer client node 202.

Among the various applications executable by the client node 202 are a web browser, which enables the display 204 to display a web page. The web page may be obtained from a server node 224 through a wireless connection with a wireless network 220. As used herein, a wireless network 220 broadly refers to any network using at least one wireless connection between two of its nodes. The various applications may likewise be obtained from a peer client node 202 or other system over a connection to the wireless network 220 or any other wirelessly-enabled communication network or system.

In various embodiments, the wireless network 220 comprises a plurality of wireless sub-networks (e.g., cells with corresponding coverage areas) 'A' 212 through 'n' 218. As used herein, the wireless sub-networks 'A' 212 through 'n' 218 may variously comprise a mobile wireless access network or a fixed wireless access network. In these and other embodiments, the client node 202 transmits and receives communication signals, which are respectively communicated to and from the wireless network nodes 'A' 210 through 'n' 216 by wireless network antennas 'A' 208 through 'n' 214 (e.g., cell towers). In turn, the communication signals are used by the wireless network access nodes 'A' 210 through 'n' 216 to establish a wireless communication session with the client node 202. As used herein, the network access nodes 'A' 210 through 'n' 216 broadly refer to any access node of a wireless network. As shown in FIG. 2, the wireless network access nodes 'A' 210 through 'n' 216 are respectively coupled to wireless sub-networks 'A' 212 through 'n' 218, which are in turn connected to the wireless network 220.

In various embodiments, the wireless network 220 is coupled to a core network 222, such as the Internet. Via the wireless network 220 and the core network 222, the client node 202 has access to information on various hosts, such as the server node 224. In these and other embodiments, the server node 224 may provide content that may be shown on the display 204 or used by the client node processor 110 for its operations. Alternatively, the client node 202 may access the wireless network 220 through a peer client node 202 acting as an intermediary, in a relay type or hop type of connection. As another alternative, the client node 202 may be tethered and obtain its data from a linked device that is connected to the wireless sub-network 212. Skilled practitioners of the art will recognize that many such embodiments are possible and the foregoing is not intended to limit the spirit, scope, or intention of the disclosure.

Figure 3:
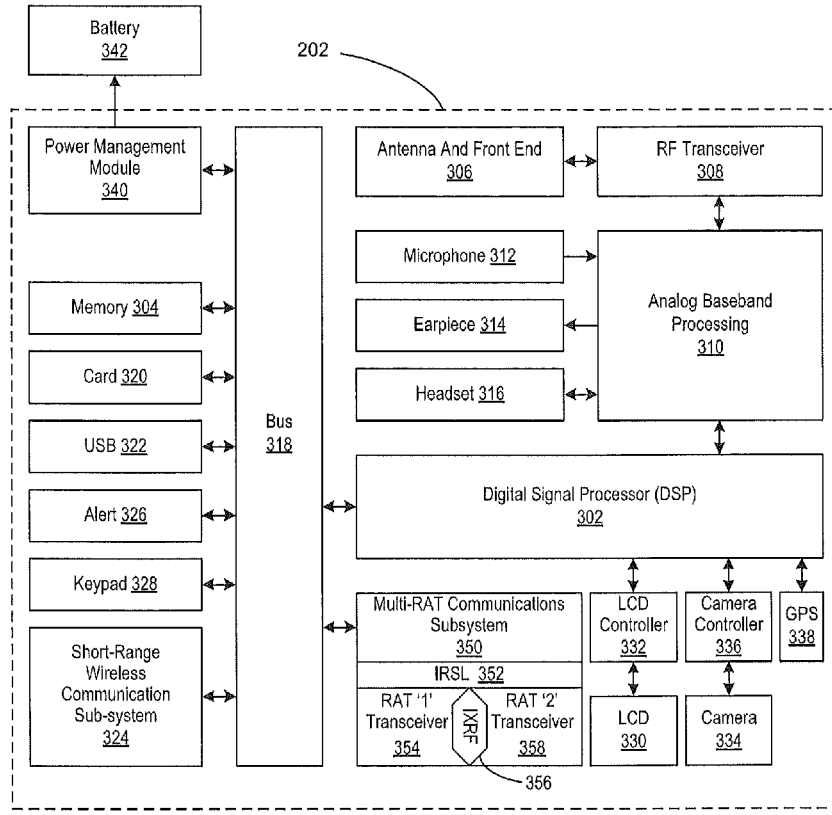
FIG. 3 is a simplified block diagram of an exemplary client node comprising a digital signal processor (DSP)

FIG. 3 depicts a block diagram of an exemplary client node as implemented with a digital signal processor (DSP) in accordance with an embodiment of the disclosure. While various components of a client node 202 are depicted, various embodiments of the client node 202 may include a subset of the listed components or additional components not listed. As shown in FIG. 3, the client node 202 includes a DSP 302 and a memory 304. As shown, the client node 202 may further include an antenna and front end unit 306, a radio frequency (RF) transceiver 308, an analog baseband processing unit 310, a microphone 312, an earpiece speaker 314, a headset port 316, a bus 318, such as a system bus or an input/output (I/O) interface bus, a removable memory card 320, a universal serial bus (USB) port 322, a short range wireless communication sub-system 324, an alert 326, a keypad 328, a liquid crystal display (LCD) 330, which may include a touch sensitive surface, an LCD controller 332, a charge-coupled device (CCD) camera 334, a camera controller 336, and a global positioning system (GPS) sensor 338, and a power management module 340 operably coupled to a power storage unit, such as a battery 342. In various embodiments, the client node 202 may include another kind of display that does not provide a touch sensitive screen. In one embodiment, the DSP 302 communicates directly with the memory 304 without passing through the input/output interface ("Bus") 318.

In various embodiments, the DSP 302 or some other form of controller or central processing unit (CPU) operates to control the various components of the client node 202 in accordance with embedded software or firmware stored in memory 304 or stored in memory contained within the DSP 302 itself. In addition to the embedded software or firmware, the DSP 302 may execute other applications stored in the memory 304 or made available via information media such as portable data storage media like the removable memory card 320 or via wired or wireless network communications. The application software may comprise a compiled set of machine-readable instructions that configure the DSP 302 to provide the desired functionality, or the application software may be high-level software instructions to be processed by an interpreter or compiler to indirectly configure the DSP 302.

The antenna and front end unit 306 may be provided to convert between wireless signals and electrical signals, enabling the client node 202 to send and receive information from a cellular network or some other available wireless communications network or from a peer client node 202. In an embodiment, the antenna and front end unit 106 may include multiple antennas to support beam forming and/or multiple input multiple output (MIMO) operations. As is known to those skilled in the art, MIMO operations may provide spatial diversity, which can be used to overcome difficult channel conditions or to increase channel throughput. Likewise, the antenna and front-end unit 306 may include antenna tuning or impedance matching components, RF power amplifiers, or low noise amplifiers.

In various embodiments, the RF transceiver 308 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 310 or the DSP 302 or other central processing unit. In some embodiments, the RF Transceiver 108, portions of the Antenna and Front End 306, and the analog base band processing unit 310 may be combined in one or more processing units and/or application specific integrated circuits (ASICs).

Note that in this diagram the RAT1 and RAT2 transceivers 354 358, the IXRF 356, the IRSL 352 and Multi-RAT sub-system 350 are operably coupled to the RF transceiver 308 and Analogue processor 310 and thence coupled to the antenna and front end 306. As there may be multiple RAT transceivers, there will typically be multiple antennas or front ends 306 or RF Transceivers 308, one for each RAT or band of operation.

The analog baseband processing unit 310 may provide various analog processing of inputs and outputs for the RF transceivers 308 and the speech interfaces (312, 314, 316). For example analog baseband processing 312 includes inputs from the microphone 312 and the headset 316 and outputs to the earpiece 314 and the headset 316. To that end, the analog baseband processing unit 310 may have ports for connecting to the built-in microphone 312 and the earpiece speaker 314 that enable the client node 202 to be used as a cell phone. The analog baseband processing unit 310 may further include a port for connecting to a headset or other hands-free microphone and speaker configuration. The analog baseband processing unit 310 may provide digital-to-analog conversion in one signal direction and analog-to-digital conversion in the opposing signal direction. In various embodiments, at least some of the functionality of the analog baseband processing unit 310 may be provided by digital processing components, for example by the DSP 302 or by other central processing units.

The DSP 302 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 302 may perform modulation, coding, interleaving, and spreading, and for a receiver function the DSP 302 may perform despreading, deinterleaving, decoding, and demodulation. In another embodiment, for example in an orthogonal frequency division multiplex access (OFDMA) technology application, for the transmitter function the DSP 302 may perform modulation, coding, interleaving, inverse fast Fourier transforming, and cyclic prefix appending, and for a receiver function the DSP 302 may perform cyclic prefix removal, fast Fourier transforming, deinterleaving, decoding, and demodulation. In other wireless technology applications, yet other signal processing functions and combinations of signal processing functions may be performed by the DSP 302.

The DSP 302 may communicate with a wireless network via the analog baseband processing unit 310. In some embodiments, the communication may provide Internet connectivity, enabling a user to gain access to content on the Internet and to send and receive e-mail or text messages. The input/output interface 318 interconnects the DSP 302 and various memories and interfaces. The memory 304 and the removable memory card 320 may provide software and data to configure the operation of the DSP 302. Among the interfaces may be the USB interface 322 and the short range wireless communication sub-system 324. The USB interface 322 may be used to charge the client node 202 and may also enable the client node 202 to function as a peripheral device to exchange information with a personal computer or other computer system. The short range wireless communication sub-system 324 may include an infrared port, a Bluetooth interface, an IEEE 802.11 compliant wireless interface, or any other short range wireless communication sub-system, which may enable the client node 202 to communicate wirelessly with other nearby client nodes and access nodes. The short-range wireless communication Sub-system 324 may also include suitable RF Transceiver, Antenna and Front End subsystems.

The input/output interface ("Bus") 318 may further connect the DSP 302 to the alert 326 that, when triggered, causes the client node 202 to provide a notice to the user, for example, by ringing, playing a melody, or vibrating. The alert 326 may serve as a mechanism for alerting the user to any of various events such as an incoming call, a new text message, and an appointment reminder by silently vibrating, or by playing a specific pre-assigned melody for a particular caller.

The keypad 328 couples to the DSP 302 via the I/O interface ("Bus") 318 to provide one mechanism for the user to make selections, enter information, and otherwise provide input to the client node 202. The keyboard 328 may be a full or reduced alphanumeric keyboard such as QWERTY, Dvorak, AZERTY and sequential types, or a traditional numeric keypad with alphabet letters associated with a telephone keypad. The input keys may likewise include a trackwheel, an exit or escape key, a trackball, and other navigational or functional keys, which may be inwardly depressed to provide further input function. Another input mechanism may be the LCD 330, which may include touch screen capability and also display text and/or graphics to the user. The LCD controller 332 couples the DSP 302 to the LCD 330.

The CCD camera 334, if equipped, enables the client node 202 to make digital pictures. The DSP 302 communicates with the CCD camera 334 via the camera controller 336. In another embodiment, a camera operating according to a technology other than Charge Coupled Device cameras may be employed. The GPS sensor 338 is coupled to the DSP 302 to decode global positioning system signals or other navigational signals, thereby enabling the client node 202 to determine its position. The GPS sensor 338 may be coupled to an antenna and front end (not shown) suitable for its band of operation. Various other peripherals may also be included to provide additional functions, such as radio and television reception.

In various embodiments, the client node (e.g. 202) comprises a first Radio Access Technology (RAT) transceiver 354 and a second RAT transceiver 358. As shown in FIG. 3, and described in greater detail herein, the RAT transceivers '1' 354 and '2' 358 are in turn coupled to a multi-RAT communications subsystem 350 by an Inter-RAT Supervisory Layer Module 352. In turn, the multi-RAT communications subsystem 350 is operably coupled to the Bus 318. Optionally, the respective radio protocol layers of the first Radio Access Technology (RAT) transceiver 354 and the second RAT transceiver 358 are operably coupled to one another through an Inter-RAT eXchange Function (IRXF) Module 356.

In various embodiments, the network node (e.g. 224) acting as a server comprises a first communication link corresponding to data to/from the first RAT and a second communication link corresponding to data to/from the second RAT.

Figure 4:
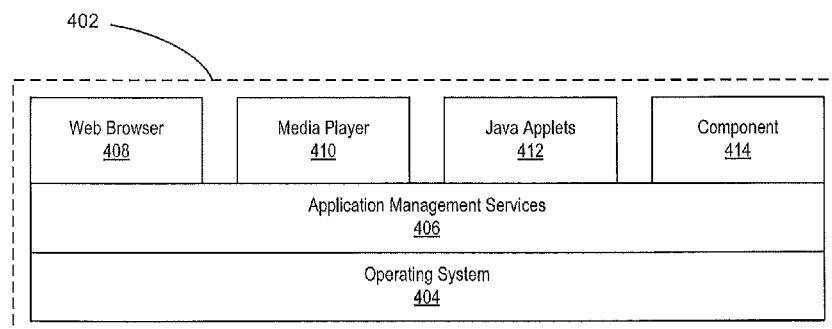
FIG. 4 is a simplified block diagram of a software environment that may be implemented by a DSP.

FIG. 4 illustrates a software environment 402 that may be implemented by a digital signal processor (DSP). In this embodiment, the DSP 302 shown in FIG. 3 executes an operating system 404, which provides a platform from which the rest of the software operates. The operating system 404 likewise provides the client node 202 hardware with standardized interfaces (e.g., drivers) that are accessible to application software. The operating system 404 likewise comprises application management services (AMS) 406 that transfer control between applications running on the client node 202. Also shown in FIG. 4 are a web browser application 408, a media player application 410, and Java applets 412. The web browser application 408 configures the client node 202 to operate as a web browser, allowing a user to enter information into forms and select links to retrieve and view web pages. The media player application 410 configures the client node 202 to retrieve and play audio or audiovisual media. The Java applets 412 configure the client node 202 to provide games, utilities, and other functionality. A component 414 may provide functionality described herein. In various embodiments, the client node 202, the wireless network nodes 'A' 210 through 'n' 216, and the server node 224 shown in FIG. 2 may likewise include a processing component that is capable of executing instructions related to the actions described above.

Skilled practitioners of the art will be aware that it is common for today's wireless client nodes to have multiple transceivers, each of which supports a different Radio Access Technology (RAT). Such RATs include Global System for Mobile Communications/General Packet Radio Service (GSM/GPRS), Universal Mobile Telecommunications System (UMTS), and WiFi. Likewise, it is common to find overlapping coverage areas that support multiple RATs operating on widely-separated carrier frequencies. In such areas, wireless devices equipped with multiple radios are not only able to access multiple RAT networks, but to also choose between them.

It will likewise be appreciated that the simultaneous availability of multiple RATs may be advantageously leveraged for more efficient communications. For example, bandwidth- and delay-sensitive applications such as video streaming can leverage the availability of multiple RATs. However, various RATs currently operate independently in today's wireless-enabled communications environment. For example, a user of a multi-radio wireless device may selectively elect to operate either in a WiFi mode or in a cellular mode, but not both, even if both RATs are available in a given location. Furthermore, a radio signal associated with an individual RAT may suffer from high variability in signal quality due to propagation loss, fading and interference.

In general, radio link reliability (i.e., availability) is 99% (expressed as "two 9s"), corresponding to 1% outage probability, compared with wireline link reliability of 99.999% (expressed as "five 9s"). However, some wireless communications (e.g. Machine to Machine (M2M) transactions require ultra-reliable communications for critical messages such as wirelessly monitoring the condition of a high-risk of a patient). To further the example, wireless patient monitoring is achieved by linking the monitoring system to a mobile wireless device. The patient is no longer required to be tethered to a wireline link for monitoring. The tradeoff for the convenience of mobility sometimes is degradation in the reliability of the communication link relative to wireline reliability. However, among multiple radio communications channels there is statistical independence of their variability and a combined use of multiple channels provides a more reliable communications service. In such cases, various embodiments of the disclosure providing integrated multi-radio communication can be used for data packets that require higher reliability than that typically available by using a single radio transmission link.

Furthermore, the higher reliability of multiple channels reduces the communications delay, which is an important factor for critical messages. Retransmitting data or transmitting additional redundant bits generated from error control coding (e.g., incremental redundancy) on a single radio link can enable the data to be eventually delivered with delay. However, such approaches cannot substantially improve the reliability of the wireless link and results in sometimes unacceptable delay in delivering the data.

While radio link quality is generally robust for most types of applications, including, for example, voice and many data services, it is not uncommon to experience outages, manifested by dropped calls or transmission errors. Moreover, it is not currently possible to achieve greater reliability using a single radio link by introducing greater redundancy in the transmitted signal due to limitations imposed by the wireless channel characteristics (e.g., the channel is likely to be correlated). As a result, the level of achievable reliability is limited when using a single radio link. As described in greater detail herein, various embodiments improve wireless link reliability for critical messages.

Figure 5:
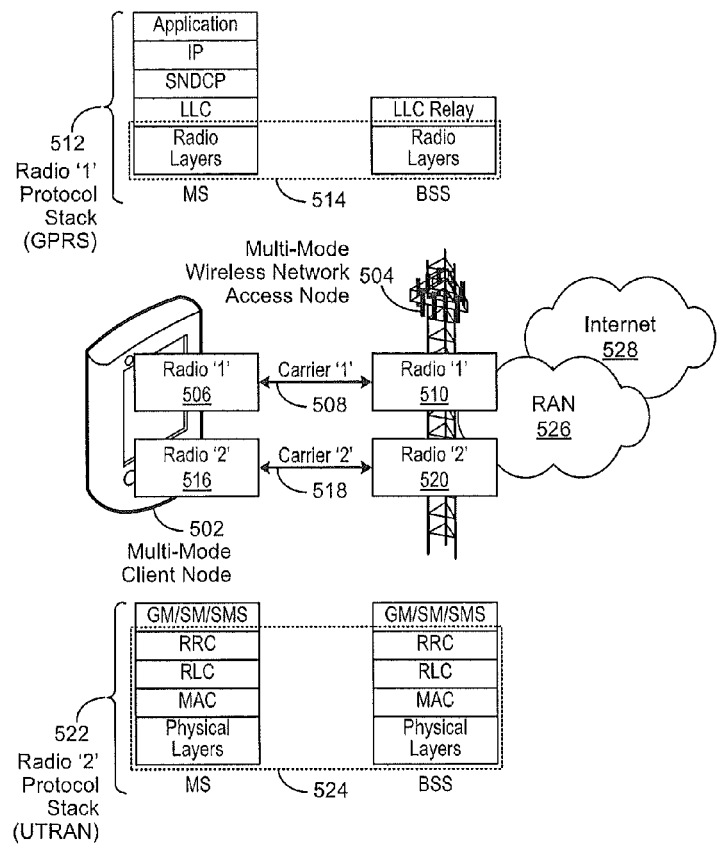
FIG. 5 is a simplified block diagram of a dual-mode mobile device as implemented in a wireless-enabled communication.
Figure 6:
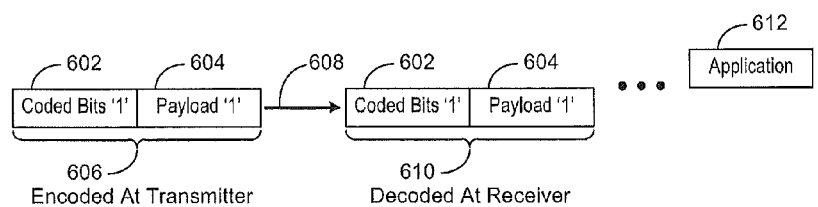
FIG. 6 is a simplified protocol stack depiction of physical layer Forward Error Control (FEC) encoding and decoding respectively implemented at a transmitter and a receiver.

FIG. 5 is a simplified block diagram of a multi-mode client node as implemented in a wireless-enabled communication environment in accordance with an embodiment of the disclosure. In this embodiment, a multi-mode client node ("client node") 502, such as a wireless device, comprises radios '1' 506 and '2' 516, respectively configured to communicate to a corresponding radios '1' 510 and '2' 520 coupled to a multi-mode wireless access node ("access node") 504. As shown in FIG. 5 by way of example, radios '1' 506 and 510 may comprise a General Packet Radio Service (GPRS) protocol stack 512, and radios '2' 516 and 520 comprise a Universal Mobile Telecommunications System (UMTS) protocol stack 522. In various embodiments, the respective radio link protocol layers 514 and 524 of the GPRS protocol stack 512 and the UMTS protocol stack 522 are implemented to initiate and conduct a communications session between the client node 502 and the access node 504 over carriers '1' 508 and '2' 518. As likewise shown in FIG. 5, the access node 504 is connected to a radio access network (RAN) 526, which in turn is connected to a core network, such as the Internet 528. Skilled practitioners of the art will recognize that many different communication protocols may be implemented in various embodiments and the foregoing is not intended to limit the spirit, scope, or intent of the disclosure.

Skilled practitioners of the art will be aware that the carrier frequency used for the operation of the first RAT is typically separated from the carrier frequency of the second RAT. The two RATs that are thus substantially separated in carrier frequency are unlikely to simultaneously suffer deep fades across their respective bands of operation. In some embodiments, the wireless link endpoints (e.g., radio '1' 506 and radio '2' 516) are collocated (e.g., at the access node 504) if the services are provided by the same operator.

It will likewise be appreciated that at any given time, the client node 502 operates in a mode as determined by the network. For example, a dual-mode (e.g., GSM/GPRS and UMTS) client node will communicate with the base station using one of the RATS (e.g., UMTS) when available. The second RAT (GSM/GPRS) is also available to the client node. In the case of a cellular/WiFi client node, the two can be employed simultaneously, provided the applications are different. For example, a user can be engaged in a cellular phone call while downloading a file on the WiFi connection. In the prior art technology, there is no co-ordination possible among multiple RATs in a client node for transmission of application data.

It will be appreciated that in addition to being exposed to a variety of impairments (e.g., propagation loss, fading, interference), wireless link behavior can be correlated when transmission occurs in the same band of operation. Approaches to address this issue include incremental redundancy, where additional coded bits are transmitted at a later time on the same link to benefit from time diversity. Other possible benefits include some degree of frequency diversity in the case of wideband Orthogonal Frequency-Division Multiple Access (OFDMA) types of transmission. However, incremental redundancy relies on time diversity and results in some delay in receiving the data. Furthermore, such approaches do not reduce the probability of outages.

Accordingly, those of skill in the art will recognize that the utilization of multiple RATs can improve reliability. For example, the corresponding outage probability for a RAT with 99% reliability is 1%, or p(outage)=0.01. If two RATs are used, each with 1% outage probability and respectively operating on widely separated carrier frequencies, the probability of both RAT suffering an outage together is 0.0001 (i.e., 0.01×0.01=0.0001) or 0.01%, corresponding to 99.99% reliability. As a result, the use of two RATs separated in carrier frequency can improve reliability from "two 9's" to "four 9s". Alternately, the use of the same RAT operating over two uncorrelated carriers can help improve reliability through redundancy.

Figure 7:
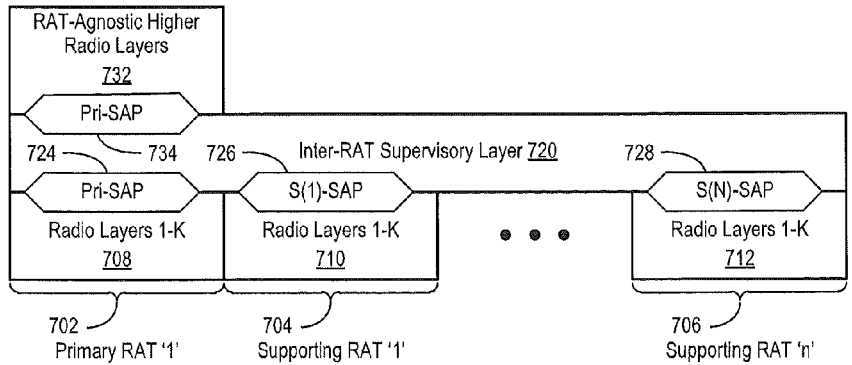
FIG. 7 is a simplified depiction of an Inter-Radio Access Technology (RAT) Supervisory Layer (IRSL) as implemented within a plurality of protocol stacks.

FIG. 7 is a simplified depiction of an Inter-Radio Access Technology (RAT) Supervisory Layer (IRSL) 720 as implemented in accordance with an embodiment of the disclosure within a plurality of protocol stacks. Skilled practitioners of the art will be aware that the implementation of a Generic Link layer (GLL) is one known approach to enabling Multi-Radio Transmission Diversity (MRTD) at the Internet Protocol (IP) packet level and Media Access Control (MAC) Packet Data Unit (PDU) level. Accordingly, MRTD can be used for increased redundancy by transmitting the same data on two radios. At the IP level, the GLL concept is applied to IP packets arriving at the GLL-enabled wireless network access node 210-216 and a common radio network controller (RNC) (not shown).

In the GLL known approach, the Wireless Local Area Network (WLAN) wireless network access node 210-216 are required to be directly connected to a common RNC. Flow control and monitoring information between the RNC and GLL-enabled wireless access node 210-216 are a part of the approach. It will be appreciated that while this approach attempts to optimize the use of radio resources, it typically results in increased design and operational complexity. Furthermore, GLL operation at wireless access node 210-216 requires interaction with Layer 2 functions at the wireless access node 210-216. Likewise, at the MAC level, a GLL-enabled wireless access node 210-216 is required to be connected to the other GLL enabled wireless access node 210-216. Integration between the multi-radio MACs is achieved with flow control and monitoring, but requires changes to the operation of the MAC, such as keeping track of PDUs with sequence numbers, measurement reports, control of ACK/NACK messages, etc.

While the GLL known approach may optimize the benefits of multi-radio transmission, it also introduces complexity and is of limited applicability. Furthermore, it introduces implementation issues in the case of wireless access node 210-216 that are not directly connected to a common RNC or another wireless access node 210-216. Moreover, it requires changes at the wireless access node 210-216. Yet another issue is the fact that GLL is primarily designed for bridging the link layers of two common RATs. As such, it is intended to function as a wrap for a common Layer 2 for the two RATs with a common scheduler feeding into the physical layer of the two RATs. As a result, there is no concept of primary RAT and supporting RATs wherein the higher layers are only interacting with the primary RAT's protocol stack. Furthermore, there is a lack of flexibility in applying the approach to selected packets from a selected application while allowing other packets to operate in the conventional manner.

Given the foregoing, it is desirable to introduce a simple and lightweight method to facilitate efficient use of multiple RATs for a variety of applications, be it configurable link reliability or for efficient transmission of a high QoS high bandwidth applications. Likewise, it is desirable to introduce a method where the presence of multiple radio protocol layers can be utilized to improve reliability without consequent changes to the radio protocol layers for the RATs being used. It is likewise desirable to introduce a method where the reliability improvement is applied to selected data units from a selected application. Furthermore, it is desirable to be able to offer a degree of control over the reliability on a per-application or a per-packet basis by taking advantage of any unused Information Elements (IEs), or bits, in the IP packet format, MAC service data unit (SDU) format, or PHY layer frame format.

Skilled practitioners of the art will likewise be aware that there are known methods to classify application data according to its required reliability. For example, reliability may comprise one sub-component of the Quality of Service (QoS) requirement for packets generated by an application. The reliability classification enables the data to be processed differently based on the application packet requirements. Known methods for such traffic classification include Diffserv and Intserv, which enable differentiated treatment of traffic at various nodes in the network.

In various embodiments of this disclosure, a wireless client node is implemented with a plurality of transceivers configured to respectively support two or more RATs, such as Global System for Mobile Communications (GSM)/General Packet Radio Service (GPRS), Universal Mobile Telecommunications System (UMTS), WiFi, etc. In these and other embodiments, each of these RATs operates on a different carrier frequency. Accordingly, RAT diversity includes frequency diversity.

In these various embodiments, application-generated data is tagged for multi-RAT reliability. Likewise, existing reliability classification mechanisms may be used to identify packets requiring high reliability, or alternatively, a different overlay Multi-RAT reliability identification can be utilized for selected application generated packets. Such Multi-RAT reliability identification is used for transmitting data packets via multiple RATs and may not be applicable for QoS treatment in other network nodes. Likewise, the application layer generates a Multi-RAT reliability data tag for the data it generates. In various embodiments, the Multi-RAT reliability data tags may be designated "Regular", "Critical" or "Very Critical." These data tags map to a required resiliency for the data and further map to the available reliability of multi-RATs. Accordingly, "Critical" and "Very Critical" data tags require a higher resiliency than data that is tagged "Regular." Likewise, the multi-RAT reliability tag provides the ability for the data to be processed differently at the application or wireless link endpoints, or both. In various embodiments, the wireless endpoints may comprise client, access, and server nodes.

Referring now to FIG. 7, an Inter-RAT Supervisory Layer (IRSL) 720 is implemented to process data for a Primary RAT '1' 702 protocol stack, and for Supporting RATs '1' 704 through 'n' 706 protocol stacks. In various embodiments, the IRSL 720 is implemented at both ends of a communication link (e.g., a client node and a server node) or at both ends of a radio link with collocated end points (e.g., a client node and an access node).

In various embodiments, the IRSL 720 is implemented at a client node, such as a mobile device and referred to herein as a "Device IRSL" (D-IRSL), communicates with the IRSL 720 implemented at an access node, such as a network access point and referred to herein as a "Network IRSL" (N-IRSL). During such communication between the D-IRSL and the N-IRSL, initial setup and periodic or event-driven updates of active RAT status are performed. In these various embodiments, the IRSL 720 spans across multiple available RAT(s) protocol stacks, such as the protocol stacks associated with Primary RAT '1' 702 and Supporting RATs '1' 704 through 'n' 706. Likewise, the IRSL 720 can be established at any layer above the radio layers "1-K" 708, and 710 through 712, respectively corresponding to the protocol stacks associated with the Primary RAT '1' 702 and Supporting RATs '1' 704 through 'n' 706 where data from multiple RATs is available. In various embodiments, the implementation of the IRSL 720 is dependent upon individual RAT configurations and whether the RAT end points are collocated.

Likewise, the IRSL 720 is linked to the RAT-Agnostic higher layers 732 of the Primary RAT '1' 702 protocol stack via the standardized Primary-Service Access Point (SAP) 734 of the respective layer below it. As a result, the lower layers "1-K" 710 through 712" of the protocol stacks associated with Supporting RATs '1' 704 through 'n' 706 are transparent to the rest of the Primary RAT '1' 702 protocol stack. As shown in FIG. 7, the Primary-SAP 734 links the RAT-Agnostic higher layers 732 to the IRSL 720, and in turn, the IRSL 720 is linked to Radio Layers "1-K" 108 of the Primary RAT '1' 702 protocol stack by Primary SAP 724. Likewise, the IRSL 720 respectively links the Primary RAT's interfacing layer with the corresponding layer for the radio layers "1-K" 710 through 712 with S(1)-SAP 726 through S(n)-SAP 728. Accordingly, the higher layers of the supporting RAT(s) are suppressed. The IRSL 720 maintains a list of active RATs in the client node and is likewise responsible for monitoring and processing the data packets to and from multiple RATs. In various embodiments, the IRSL 720 is likewise responsible for setting up, maintaining and terminating the links and the protocol stacks associated with Supporting RATs '1' 704 through 'n' 706.

It will be appreciated that the introduction of the IRSL 720 between the respective protocol layers of various RATs enables a degree of control related to reliability. In various embodiments described in greater detail herein, the IRSL 720 transmits and receives predetermined data through the RAT layers below it.

In various embodiments, the IRSL 720 selects the protocol stack associated with the primary RAT '1' 702 and the supporting RATs '1' 704 through 'n' 706 according to link performance (e.g., packet loss rate at IP layer) or the channel conditions of the radio links, depending on which layer it is applied. In these and other embodiments, when the IRSL 720 is employed to improve resiliency, its operation is essentially transparent for all data that is tagged "Regular," which only uses the Primary RAT '1' 702 protocol stack. In various embodiments, the application in use activates the D-IRSL in the client node, which in turn communicates with the N-IRSL located in the relevant network node. In these and other embodiments, the relevant network node may be a network or application server when the RAT endpoints are not collocated, or an access node when RAT endpoints are collocated.

Likewise, the coordination between a D-IRSL and a N-IRSL is enabled when the client node is powered up and initial network entry (association) procedures are completed using any of the RATs on the device (e.g., a client node). Either the D-IRSL or the N-IRSL can query its counterpart to validate its existence. In various embodiments, the information exchanged between the D-IRSL and the N-IRSL establishes the existence of an IRSL on the client node side and the network side (e.g., access node, network node, or server node). Likewise, the exchanged information establishes the identity and number of active RATs in the client node, and whether the RAT endpoints are collocated at the network side. In one embodiment, the D-IRSL sends a query to a network node with a list of RATs supported by the IRSL 720. If there is no response within a timeout period, the D-IRSL determines that there is no IRSL 720 present at the network side and does not activate IRSL 720 functionality. However, if the network node supports IRSL 720 functionality, the network node will respond affirmatively to the query with the sub-list of matching supported RATs. In turn, the D-IRSL compares its supported RATs with the list, which allows the D-IRSL to determine if the RAT endpoints are collocated. For example, the IRSL 720 may be located on the network side in a relay node, a server node, an access node, or all such nodes, depending upon on the location of the RAT end points. In various embodiments, an instantiation of the IRSL 720 is activated when the D-IRSL and N-IRSL handshake is successful.

In one embodiment, the D-IRSL sends a query to the application server running the target application to confirm the presence of an N-IRSL if the D-IRSL has not identified any collocated RATs from the aforementioned procedures. If the response to the query is affirmative, both the N-IRSL and D-IRSL are activated for the specific application running on the application server. The D-IRSL then exchanges with the N-IRSL its list of supported RATs that do not have collocated endpoints along with their respective IP addresses.

From the foregoing, it will be apparent to those of skill in the art that the D-IRSL is aware of the RATs at the client node, knows if the multiple RATs in the client node have collocated or non-collocated endpoints, and knows if N-IRSL is enabled at the application server or network nodes. Likewise, the N-IRSL knows if IRSL 720 is enabled at the client node and is aware of the active RATs with collocated or non-collocated endpoints that a client node is equipped with, and is aware of the client node IP address corresponding to each of these active RATs. It will be appreciated that if a RAT is powered down or inactive (e.g., deregistered), it cannot be used for communication until it is powered up.

It will likewise be appreciated that multiple IRSL 720 instantiations may be activated in the client node depending on the type (e.g., collocated end points, non-collocated end points) of active RATs. In various embodiments, a client node for example, with three RATs (e.g., UMTS/HSDPA, GSM/GPRS, WiFi) can have a first IRSL implemented for a first application in use below the IP layer for the first RAT and second RAT that comprise collocated RATs (e.g., HSDPA, GPRS) and a second independent IRSL implemented for a second application in use above the IP layer between the second RAT and the third RAT.

In various embodiments, the IRSL 720 is implemented at the transmit end as a D-IRSL and the IRSL 720 implemented at the receive end is the N-IRSL for uplink transmissions. In various other embodiments, the IRSL 720 implemented at the transmit end is the N-IRSL and the IRSL 720 implemented at the receive end is the D-IRSL for downlink transmissions.

Figure 8:
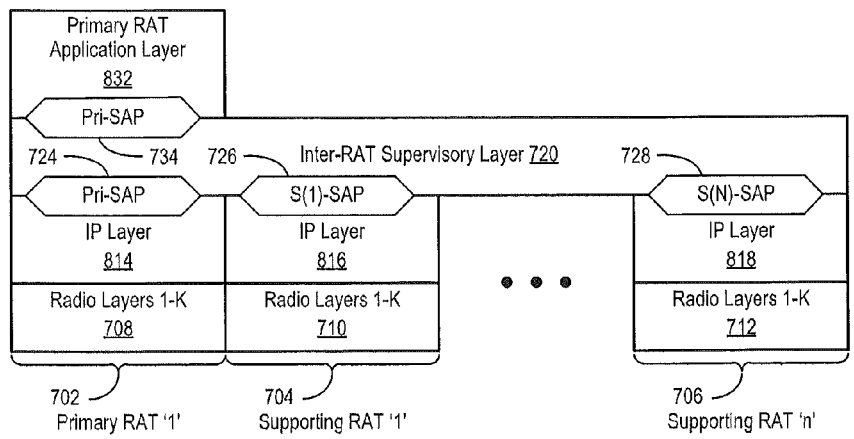
FIG. 8 is a simplified depiction of an IRSL as implemented below the application layer within a plurality of protocol stacks.

FIG. 8 is a simplified depiction of an Inter-Radio Access Technology (RAT) Supervisory Layer (IRSL) as implemented in accordance with an embodiment of the disclosure below the application layer within a plurality of protocol stacks. In this embodiment, RAT endpoints are not collocated and selective reliability is applied below the Primary RAT Application Layer 832 of the protocol stack associated with Primary RAT '1' 702. Based upon the reliability tag assigned to data generated by a given application, the transmission is performed in the conventional manner on the most reliable wireless link available at the device (e.g., a client node), or alternatively, selected components of the data are transmitted over multiple independent wireless links. Accordingly, the increased overall redundancy provided by the use of independent wireless links improves the robustness of selected transmissions closer to "five 9s" reliability.

In this and other embodiments, the application-generated packets are transmitted using a first preferred wireless mode, such as WiFi if the device is within a hot spot area. The critical, or very critical, packet subset are transmitted using a second preferred wireless mode, such as Universal Mobile Telecommunications System (UMTS) if the device is in a 3G coverage area. As shown in FIG. 8, the IRSL 720 at the transmit end examines the application generated packets, and forwards all the packets to the IP layer 814 of the protocol stack associated with the Primary RAT '1' 702. The "Critical" packets are also forwarded to the IP layer 816 of the protocol stack associated with the Supporting RAT '1' 704. The "Very Critical" packets are forwarded to the respective IP layer 818 of a plurality of protocol stacks associated with Supporting RATs 'n' 706, when and if available. Likewise, there is no coordination between transmissions of the respective RATs. Each RAT independently models its full protocol stack.

In this embodiment, the IRSL 720 implemented at the transmitting node first identifies selected application packets for priority reliable transmission. It then duplicates the selected application packets, followed by forwarding a first copy of the selected packets to the IP layer 816 of the protocol stack associated with the Secondary RAT '1' 704 (e.g., UMTS). Thereafter, it forwards a second copy of the selected packets to the IP layer 818 of the protocol stack associated with the Supporting RAT 'n' 706 (e.g., WiFi).

At the receiving end of the communications link, for example in a network server node for the uplink direction, once the transmitted IP packets are received and reassembled into application packets, the data reliability tag is checked by the IRSL 720. If the tag is "Regular", the received data is forwarded directly to the application. If the reliability tag is "Critical", and if the "Critical" application packet is successfully received via the Primary RAT '1' 702, then the received application packets from the Supporting RATs '1' 704 through 'n' 706 may be discarded. If the application packet from the Primary RAT '1' 702 is not received correctly, the correct application packet from one of the Supporting RATs '1' 704 through 'n' 706 will be forwarded to the application. It will be appreciated that it is likely that at least one of the packets from multiple links will be received successfully. Accordingly, the reliability of the combined reception for the selected critical packets improves closer to 99.999%. In this embodiment, since the wireless links terminate at different network nodes (e.g., an access point for WiFi and a Node B for UMTS), it is not possible to perform any form of selective processing of the independently received data except at the communication end point, e.g., network server node.

The IRSL is conveniently implemented as a flexible software instantiation that is invoked based on application needs and capabilities of the client node and the network node. In some embodiments, the IRSL may be implemented only on the uplink. In some other embodiments, the IRSL may be implemented only on the downlink. In some other embodiments the IRSL may be implemented on both the uplink and downlink.

Following reassembly of application packets at the receive end (i.e., the application end point), the IRSL 720 maintains a counter of the packet number corresponding to the received packets, such that when a packet arrives and is successfully decoded, its packet number is checked against the counter. If selection diversity is enabled, and if the packet number is greater than the counter, then the counter is updated to match with the received packet number. In one embodiment, the packets are processed in their received sequence and out-of-sequence patents are buffered until sequence order is obtained. However, if diversity combining is not enabled, the packet is forwarded to the application. Otherwise the packet is stored in the IRSL 720 buffer. If the received packet number is equal to, or smaller than, the counter, the packet is discarded. Otherwise, the packet is combined with the other packet stored in IRSL 720 buffer. For example, Cyclic Redundancy Check (CRC) operations may be performed to determine whether packets have been correctly received. If the check is successful, then there is assurance that the message is correct and the packet is forwarded to the application. Accordingly, the IRSL 720 examines the data reliability tags at the transmit end, and the receive end, and then takes the requisite action as described herein above.

It will be appreciated that this embodiment is equally applicable when the RAT endpoints are collocated. It will likewise be appreciated that the disclosure enables RAT diversity at the application end points irrespective of where they may be located. Likewise, since the multiple transmissions are only for data tagged "Critical" or "Very Critical," there is little benefit from adding further complexity in the network nodes for minimizing priority transmissions, since these incidents are expected to be less frequent than regular traffic.

Figure 9:
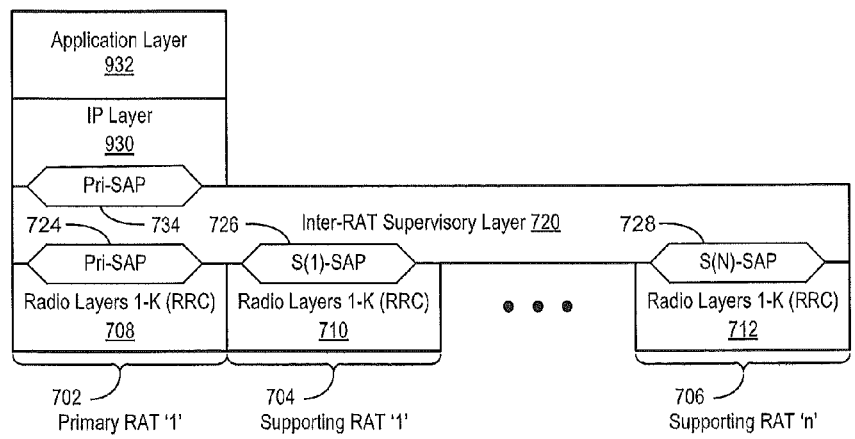
FIG. 9 is a simplified depiction of an IRSL as implemented below the Internet Protocol (IP) layer of a protocol stack associated with a Primary RAT.

FIG. 9 is a simplified depiction of an Inter-Radio Access Technology (RAT) Supervisory Layer (IRSL) as implemented in accordance with an embodiment of the disclosure operating below the Internet Protocol (IP) layer of a protocol stack associated with a Primary RAT. In this embodiment, RAT endpoints are collocated, or have some pre-determined means to exchange the data, and selective reliability is applied below the IP layer 930 of the protocol stack associated with Primary RAT '1' 702.

In this embodiment, the application layer 932 generates a reliability data tag for the data at the transmitting end. If the data tag is "Critical" or "Very Critical," the IP layer 930 appends the tag to the IP packets and delivers them to the layer below, in this case the IRSL 720. This process may be similar to that followed for known Quality of Service (QoS) mechanisms, wherein the IP packet is tagged with the QoS information prior to it being delivered to the lower layer. The IRSL 720 then reads the reliability tag on the IP packets, and if the tag indicates "Critical" or "Very Critical," it replicates the IP packets to the radio link layer of the protocol stacks associated with the Primary RAT '1' 702 and the Supporting RATs '1' 704 through 'n' 706. Multiple Transmissions are then generated at the radio link layer of the Supporting RAT '1' 704. If there are additional supporting RATs available at the client node, data with a "Very Critical" reliability tag is additionally transmitted, using the protocol stack associated with and successive available Supporting RATs 'n' 706. It will be appreciated that the IRSL 720 is transparent for all data that is tagged "Regular" since only the Primary RAT '1' 702 is employed to transmit the data.

In this embodiment, the IRSL 720 implemented at the transmitting node first identifies selected IP packets for multiple transmission. It then duplicates the identified IP packets, followed by forwarding a first copy of the selected packets to the radio link layer of the protocol stack associated with the Primary RAT '1' 702 (e.g., UMTS). It then forwards a second copy of the selected packets to the radio link layer of the protocol stack associated with the Supporting RAT '1' 704 (e.g., GSM). It will be appreciated that the duplication of packets referred to herein may be implemented in a number of ways and need not necessarily require physical duplication of the packets in the memory of the apparatus. The duplication may be equivalently accomplished, for example, by making separate calls to the protocol stacks of the selected RAT layers, each with a reference to the memory location of the selected packets.

At the receiving end, once the radio link layer packets are reassembled into IP packets, the data reliability tag is checked by IRSL 720. If the tag is "Regular", the received data is forwarded to the application layer 932. If the reliability tag is "Critical", or if the "Critical" IP packet is successfully received via the Primary RAT '1' 702, it is forwarded to the application layer 932 and corresponding multiple IP packets received from the Supporting RATs '1' 704 through 'n' 706 may be discarded. If the IP packet from the Primary RAT '1' 702 is not received correctly, the correct IP packets from one of the Supporting RATs '1' 704 through 'n' 706 will be forwarded by IRSL to the application layer. It will be appreciated that it is likely that at least one of the packets from multiple links will be received successfully. Accordingly, the reliability of the combined transmission for the selected critical data improves closer to 99.999%. Since the wireless links terminate at the same location, it is possible to perform selection of the independently received data at the IP layer 930. Likewise, the higher layers of the protocol stack are unaware of the multiple transmissions via multiple RATs below the IP layer 930. Following reassembly of the IP packets at the receive end, the IRSL 720 forwards correctly received packets to higher layer and discards redundant copies. Those of skill in the art will realize that in this configuration any form of diversity combining can also be applied as described in the text associated with FIG. 8.

It will be appreciated that multi-RAT transmission is applied selectively in this embodiment to those application packets tagged "Critical" or "Very Critical" and that a single IP layer 930 can subtend multiple RATs operating independently at the radio protocol layers. Furthermore, there is no requirement to monitor or perform flow control at the Media Access Control (MAC) layer to optimize redundancy. Accordingly, this embodiment addresses any collocated RAT end points, such as GSM/GPRS, UMTS, or Long Term Evolution (LTE). Likewise, the disclosure is implementable with the apparatus included in the client node and network node as illustrated in FIG. 3. Moreover, the disclosure makes it possible to implement an additional level of diversity combining in this and other embodiments.

Figure 10:
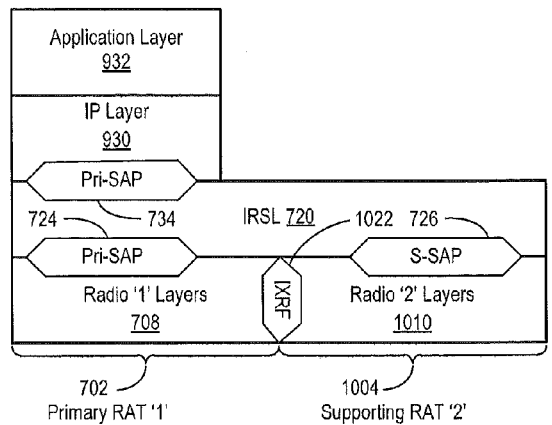
FIG. 10 is a simplified depiction of an IRSL as implemented with an Inter RAT eXchange Function (IRXF) between the radio protocol stacks of a Primary and a Secondary RAT.

FIG. 10 is a simplified depiction of an Inter-Radio Access Technology (RAT) Supervisory Layer (IRSL) as implemented in accordance with an embodiment of the disclosure with an Inter RAT eXchange Function (IRXF) between the radio protocol stacks of a Primary and a supplementary RAT (or RATs). In this embodiment, RAT endpoints are collocated and selective reliability is applied at the PHY layer of the protocol stack respectively associated with Primary RAT '1' 702 and Supporting RAT '2' 1004. In this and other embodiments, the multiple links are mutually implemented in an independent manner to provide a high link reliability when the wireless endpoints are collocated. Likewise, a client node configuration may be used that allows active RAT transmissions in tandem order to minimize disruption from alternating transmissions on different radio apparatus or to different networks.

As shown in FIG. 10, the IRSL 720 is implemented with an IRXF 1022 between the radio protocol stacks associated with Primary RAT '1' 702 and Supporting RAT '2' 1022. In one embodiment, multiple RATs may respectively interface with the Primary RAT '1' 702 through individual dedicated IRXFs 1022 between them. As likewise shown in FIG. 10, the IRSL 720 spans across the protocol stacks associated with the Primary RAT '1' 702 and Supporting RAT '2' 1022 and is linked via the Supporting Service Access Point (S-SAP) to the Supporting RAT '2' 1022 protocol stack. As in other embodiments described herein, the IRSL 720 replicates selected IP packets to the protocol stacks associated with the Primary RAT '1' 702 and Supporting RAT '2' 1022. In addition, an IRXF 1022 is implemented to allow exchange of physical (PHY) layer priority-coded bits between the protocol stacks associated with the Primary RAT '1' 702 and Supporting RAT '2' 1022 to allow inter-RAT transfer of incremental redundancy bits without a need to modify their respective protocol stacks. Accordingly, the implementation of the IRXF 1022 provides a greater degree of control of reliability, from transmitting a full replica of the data on both links as in other embodiments, to only transmitting predetermined priority bits.

Likewise, the IRXF 1022 provides the ability to exchange priority data bits between physical layers of the RATs involved in the transmission. Accordingly, reliability can be configured by transmitting priority IP packets only, only priority bits on different RAT interface(s), or both priority IP packets and cross-RAT priority bits for higher reliability. In one embodiment, the supporting RAT may be carrying its own traffic in addition to the priority bits from the primary RAT when only priority bits are transmitted on the supporting RAT interface. In this embodiment, the transmission of priority bits is a form of incremental redundancy with frequency diversity. Compared to incremental redundancy with time diversity, the delay is minimized since the transmission occurs simultaneously on a different RAT or carrier frequency. It will be appreciated that the multi-RAT transmission diversity of priority bits will lead to better performance than transmission diversity of priority bits with time diversity on the same carrier.

In this embodiment, the application layer generates a reliability data tag for the data at the transmitting node. If the data tag is "Critical" or "Very Critical," the IP layer 930 appends the tag to the IP packets and delivers them to the layer below. This process is similar to that followed for Quality of Service (QoS) mechanisms, wherein the IP packet is tagged with the QoS information prior to delivering to the lower layer. The IP Layer 930 then forwards the IP packets to the IRSL 720. As in other embodiments described herein, the IRSL 720 duplicates selected IP packets after examining the reliability tag. Alternatively, the IRSL 720 may be configured to ignore the reliability tag and forward the IP packet to the radio '1' layer 708 and radio '2' layer 1010. At the radio '2' layer 1022, the reliability tag on the arriving IP packet may be examined, and the radio '2' layer may utilize an available Information Element (IE) to indicate desired redundancy to the physical layer. In turn, the physical layer reads the redundancy tag on the radio '2' layer packet and if the tag is set, it sets the physical layer IE that indicates that the Primary RAT '1' 702 receiver is to draw from the transmission on the Supporting RAT '2' 1022.

If the IE is set, the extra bits generated by error control coding at the Primary RAT '1' 702 physical layer are transferred to the Supporting RAT '2' 1004 transmit buffer. When the supporting RAT interface is enabled the error control coding bits are transmitted. The error control coding bits may be explicitly scheduled by the MAC layer scheduler of the supporting RAT or included by any manner known in the art for transmission of incremental redundancy bits (e.g., punctured into the physical layer data frame carrying information being transmitted in the supporting RAT). In this manner, the IRXF provides a channel between the RATs for exchange of relevant error control bits. The IRSL and IRXF are transparent for all data that is tagged "Regular" since only the primary RAT is employed to transmit the data packets and no extra error control bits are transmitted.

At the receiving end, the primary RAT's physical layer received data packet's IE indicates that the receiver physical layer has to process additional error control coding bits received via the alternate interface. The supporting RAT's received physical layer data packet's IE also indicates that the data belongs to the primary RAT. The supporting RAT transfers this data packet to the primary RAT's receive buffer. At the primary RAT, data is drawn from the receive buffer and processed along with the received physical layer data. Once the physical layer frames are processed in accordance with the IEs, they are reassembled into MAC SDUs and forwarded up the primary protocol stack. At the IRSL, the same procedure as followed in Embodiment 2 is carried out for the reassembled IP packets.

In this manner, the reliability of the combined transmission for the selected critical data improves closer to 99.999%. Since the RATs begin and terminate at the same location, it is possible to process and combine received information from multiple RATs. The higher layers of the primary RAT protocol stack are unaware of the transmissions via multiple RATs below the MAC layer.

Figure 11:
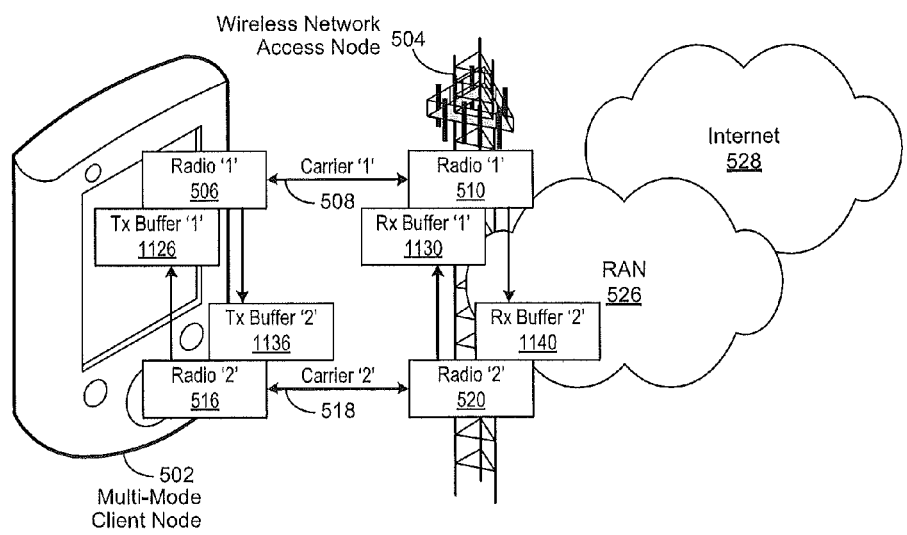
FIG. 11 is a simplified block diagram of a multi-mode client node and an access node respectively implemented with a plurality of transmit and receive buffers.

FIG. 11 is a simplified block diagram of a multi-mode client node and an access node respectively implemented in accordance with an embodiment of the disclosure with a plurality of transmit and receive buffers. As shown in FIG. 11, the multi-mode client node 502 comprises radios '1' 506 and '2' 516 and corresponding transmit (Tx) buffers '1' 1126 and '2' 1136. As likewise shown in FIG. 11, the wireless network access node 504 comprises radios '1' 510 and '2' 520 and corresponding receive (Rx) buffers '1' 1130 and '2' 1140. In this and other embodiments, the client node radios '1' 506 and '2' 516 are respectively configured to initiate a communication sessions over network connections with carrier '1' 508 and '2' 518 with access node radios '1' 510 and '2' 520. In turn, the communication sessions are conducted over connections to a radio access network (RAN) 526, which is in connected to a core network, such as the Internet 528.

In this embodiment, selected priority data from physical layer coding for each radio access technology (RAT) is transferred into the transmit buffer for the other RAT, along with proper identification, such as by including an Information Element (IE). For example, as shown in FIG. 11, the data is respectively transferred from radios '1' 506 and '2' 516 to Tx buffers '2' 1136 and '1' 1126. In turn, the data is then respectively transmitted on carrier '1 508 and '2' 518. Accordingly, the data from Radio '1' 506, which corresponds to Primary RAT '1' and is stored in Tx buffer '2' 1136 is transmitted as a payload on Carrier '2' 518, which corresponds to Supporting RAT '2'. At the receiver, following demodulation of the data, the data originating from Radio '1' 506 is identified and transferred to Rx buffer '1' 1130 and similarly data transmitted from Radio "2" 520 is also transferred to Rx Buffer "1" 1130. Each RAT uses this additional priority information to process the signal received on its own carrier for decoding. Since the priority information is transmitted on a separate carrier, the likelihood of correlated errors is decreased significantly.

Likewise, the supporting RAT and primary RAT can exchange their respective roles for alternate transmissions. Extra error control coding bits generated by the supporting RAT interface are buffered and transferred to the primary RAT interface. The data transmission can be alternated between these two interfaces. For example, data from Radio '2' 516, which is stored in Tx buffer '1' 1126 is transmitted as payload on carrier '1' 508, which uses RAT '1.' In this and other embodiments, the two RATs alternate as the Primary and Supporting RAT.

If there are additional supporting RATs available at the device (e.g., the multi-mode client node 502), then the error control data bits may be transmitted using a third and successive available RATs. In one embodiment, the Media Access Control (MAC) address of the RAT would be appended to the data transferred via the Inter RAT eXchange Function (IRXF) such that the data would be directed to the correct RAT for combined decoding.

Figure 12:
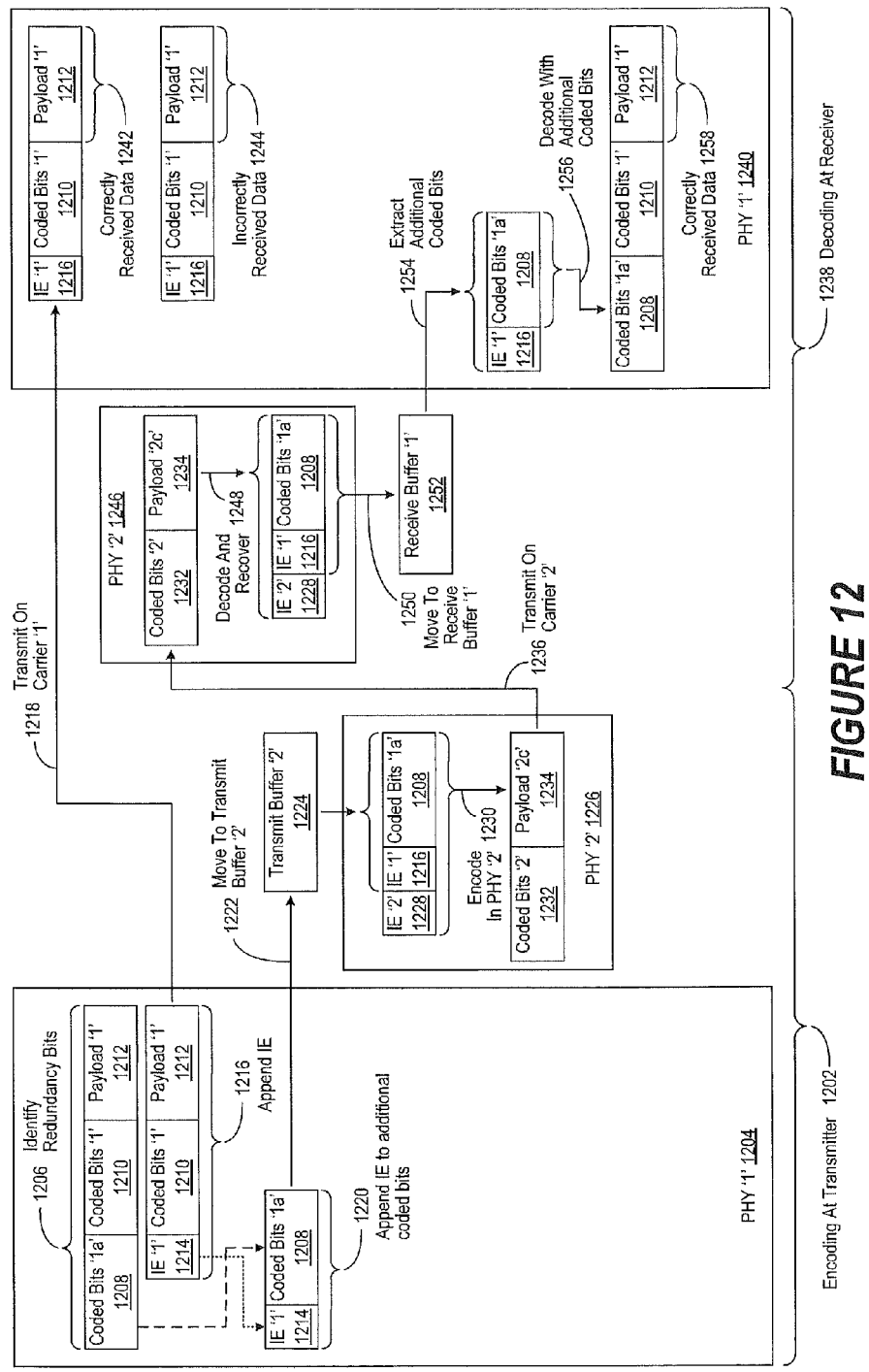
FIG. 12 is a simplified block diagram illustrating the use of physical (PHY)-layer FEC for the transmission of priority coded bits on a Supporting RAT.

FIG. 12 is a simplified block diagram illustrating the use of physical (PHY)-layer Forward Error Correction (FEC) for the transmission of error control coded bits on a Supporting Radio Access Technology (RAT) as implemented in accordance with an embodiment of the disclosure. In this embodiment, data bits are encoded 1202 at a transmitter. Then, using a first and second RAT, they are transmitted to a receiver, where they are decoded 1238. Referring now to FIG. 12, the FEC code comprises, coded bits '1' 1210, payload '1' 1212, and error control coded bits '1a' 1208, which will be transmitted on an alternative carrier. The error control coded bits '1a' 1208 are identified in step 1206. Thereafter, an Information Element (IE) '1' 1214, as described detail herein, is appended to the coded bits '1' 1210 and payload '1' 1212. Then, in step 1218, the IE '1' 1214, coded bits '1' 1210, and payload '1' 1212 are transmitted on carrier '1' over PHY layer '1' 1204 of the transmitter to the PHY layer '1' 1240 of the receiver.

The error control coded bits '1a' 1208 are then appended to IE '1' 1214 in step 1220 to indicate that the receiver processing the data can draw from the transmission on carrier '2'. The IE '1' 1214 and the error control coded bits '1a' 1208 are then moved in step 122 to the transmit (Tx) '2' buffer 1224 associated with radio '2' of the transmitter. Then, IE '2' 1228 is appended to the IE '1' 1214 and the error control coded bits '1a' 1208 to indicate that the data originated from radio '1,' followed by encoding the bits in the PHY layer of radio '2' 1226 in step 1230. The resulting payload '2c' 1234 is appended to coded bits '2' 1232 and then transmitted in step 1236 on carrier '2' over PHY layer '2' 1226 of the transmitter to the PHY layer '2' 1246 of the receiver. In one embodiment, the Primary RAT is used for another application. In this embodiment, extra error control y bits are generated by Radio '2' and are buffered and then transferred to Radio '1', where they are used to provide an alternative high-resiliency transmission. The data transmission is then alternated between the two RAT interfaces.

As shown in FIG. 12, the IE '1' 1214, coded bits '1' 1210, and payload '1' 1212 that were transmitted on carrier '1' over the PHY layer '1' 1204 of the transmitter are received on the PHY layer '1' 1240 of the receiver. In one embodiment, the payload '1' data 1212 is correctly received 1242. In this embodiment, any data subsequently received on the PHY layer '2' 1246, as described herein, is discarded. In another embodiment the payload '1' data 1212 is incorrectly received 1244.

In this embodiment, IE '1' 1216 indicates that the receiver has the option to process additional error control bits received via an alternate interface (e.g., via PHY layer '2' 1246). If the receiver elects to receive the additional error control bits via an alternative interface, then a retransmission request is not sent. Thereafter, the coded bits '2' 1232 and payload '2c' 1234 that was transmitted in step 1236 on carrier '2' over PHY layer '2' 1226 of the transmitter is received over the PHY layer '2' 1246 of the receiver. The payload '2c' 1234 is then decoded and recovered in step 1248 to generate the coded bits '1a' 1208, IE '1' 1216, and IE '2' 1228. The coded bits '1a' 1208 and IE '1' 1216 are then moved in step 1250 to the receive buffer '1' 1252. In step 1254, IE '2' 1228 is removed and the coded bits '1a' 1208 and IE '1' 1216 are processed to extract the additional coded bits '1a' 1208. In turn, in step 1256, the coded bits '1a' 1208 are processed with the coded bits '1' 1210 received on PHY 1240 to generate correctly received 1258 payload data '1' 1212.

Figure 13:
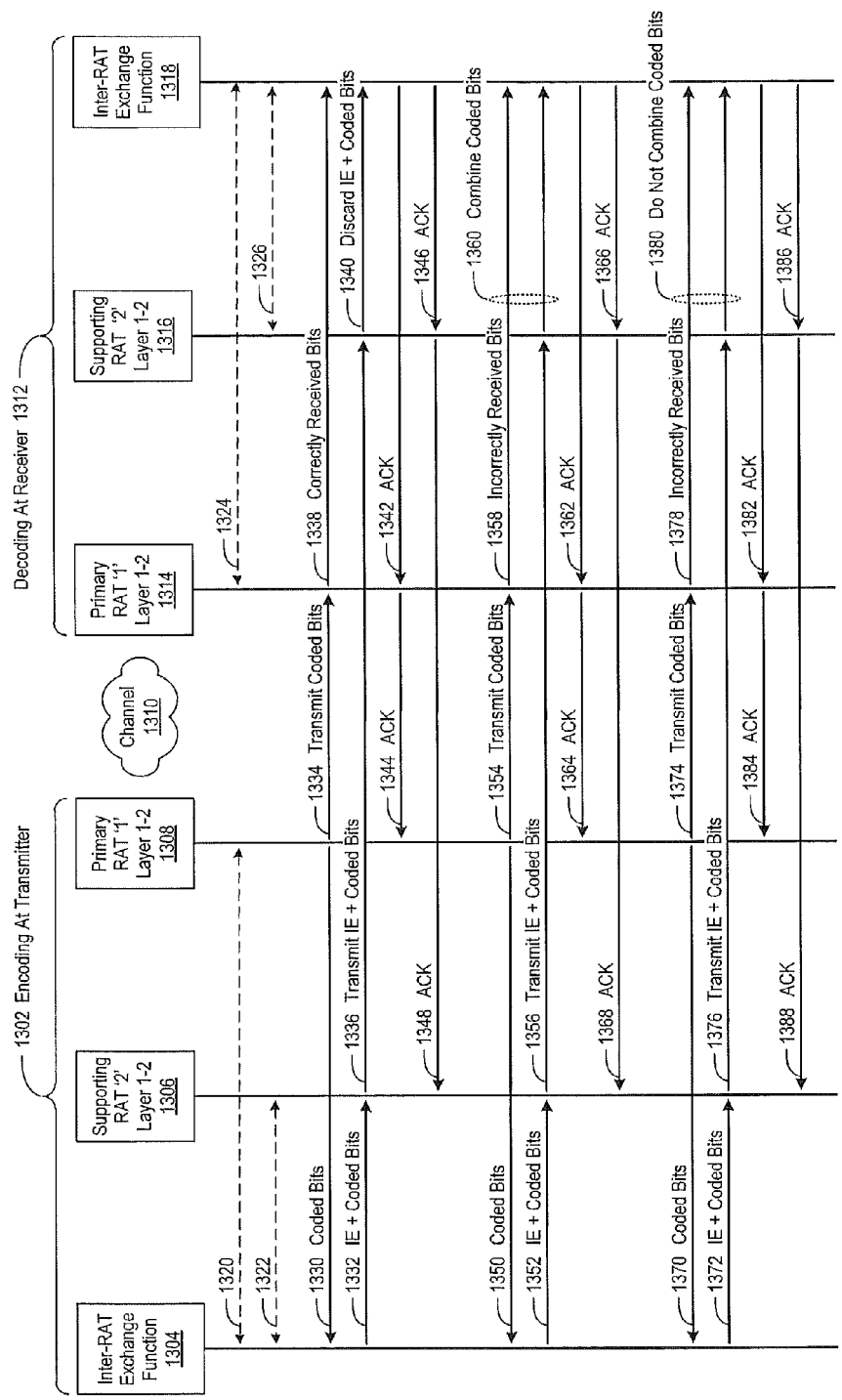
FIG. 13 is a simplified process signal flow diagram illustrating the processing and acknowledgement of data use received on a Supporting RAT.

FIG. 13 is a simplified process signal flow diagram illustrating the processing and acknowledgement of data use received on a Supporting Radio Access Technology (RAT) as implemented in accordance with various embodiments of the disclosure. In these and other embodiments, data bits are encoded 1302 at a transmitter. Then, using a first and second RAT, they are transmitted over a channel 1310 of a wireless-enabled communications environment to a receiver, where they are decoded 1312. As described in greater detail herein, an Inter-RAT eXchange Function (IRXF) 1304 and 1318 is respectively implemented on the transmitter and receiver. The implementation of the IRXF 1304 and 1318 respectively allows the exchange of, for example, physical (PHY) layer error control-coded bits between layers 1-2 of the protocol stacks associated with Primary RAT '1' 1308 and 1314 with Supporting RAT '2' 1306 and 1316. As likewise described in greater detail herein, the implementation of the IRXF 1304 and 1318 allows inter-RAT transfer of incremental redundancy bits without a need to modify their respective protocol stacks. Accordingly, the implementation of the IRXF 1304 and 1318 provides a greater degree of control of reliability, from transmitting a full replica of the data on both links as in other embodiments, to only transmitting predetermined error control bits.

In one embodiment, as described in greater detail herein, coded bits are provided in step 1330 by layers 1-2 of the protocol stack associated with the transmitter's Primary RAT '1' 1308 to the transmitter's IRXF 1304. In turn, the IRXF 1304 provides the coded bits to layers 1-2 of the protocol stack associated with the transmitter's Supporting RAT '2' 1306. Once received, the Supporting RAT '2's' 1304 IXRF appends an information element (IE) to the coded bits in step 1332. The Primary RAT '1' 1308 then transmits the coded bits in step 1334 over channel 1310 to layers 1-2 of the protocol stack associated with the receiver's Primary RAT '1' 1314. Likewise, the Supporting RAT '2' 1306 transmits the IE and the coded bits over channel 1310 to layers 1-2 of the protocol stack associated with the receiver's Supporting RAT '2' 1316 in step 1336.

If the coded bits received over layers 1-2 of the protocol stack associated with the receiver's Primary RAT '1' 1314 are correctly received, then the IE and coded bits received over layers 1-2 of the protocol stack associated with the receiver's Secondary RAT '2' 1316 are discarded by IRXF in step 1340. The receiver's IXRF 1318 then respectively sends acknowledgement (ACK) messages in steps 1342 and 1346 over layer 1 of the protocol stacks corresponding to the Primary RAT '1' 1314 and the Secondary RAT '2' 1316 associated with the receiver. In turn, an ACK message is respectively sent in steps 1344 and 1348 over the channel 1310 to layer 12 of the protocol stacks associated with the transmitter's Primary RAT '1' 1308 and Supporting RAT '2' 1306 over layer 1 of the protocol stacks corresponding to the receiver's Primary RAT '1' 1314 and the Secondary RAT '2' 1316.

In another embodiment, as described in greater detail herein, coded bits are provided in step 1350 by layer 1 of the protocol stack associated with the transmitter's Primary RAT '1' 1308 to the transmitter's IRXF 1304. In turn, the IRXF 1304 provides the coded bits to layer 1 of the protocol stack associated with the transmitter's Supporting RAT '2' 1306. Once received, the Supporting RAT '2' 1305 appends an information element (IE) to the coded bits in step 1352. The Primary RAT '1' 1308 then transmits the coded bits in step 1354 over channel 1310 to layers 1-2 of the protocol stack associated with the receiver's Primary RAT '1' 1314. Likewise, the Supporting RAT '2' 1306 transmits the IE and the coded bits over channel 1310 to layer 1 of the protocol stack associated with the receiver's Supporting RAT '2' 1316 in step 1356.

If the coded bits received over layer 1 of the protocol stack associated with the receiver's Primary RAT '1' 1314 are incorrectly received, then they are combined as described in greater detail herein in step 1360 with the IE and coded bits received over layer 1 of the protocol stack associated with the receiver's Secondary RAT '2' 1316. The receiver's IXRF 1318 then respectively sends acknowledgement (ACK) messages in steps 1362 and 1366 over layer 1 of the protocol stacks corresponding to the Primary RAT '1' 1314 and the Secondary RAT '2' 1316 associated with the receiver. In turn, an ACK message is respectively sent in steps 1364 and 1368 over the channel 1310 to layer 1 of the protocol stacks associated with the transmitter's Primary RAT '1' 1308 and Supporting RAT '2' 1306 over layer 1 of the protocol stacks corresponding to the receiver's Primary RAT '1' 1314 and the Secondary RAT '2' 1316.

In yet another embodiment, as described in greater detail herein, coded bits are provided in step 1370 by layer 1 of the protocol stack associated with the transmitter's Primary RAT '1' 1308 to the transmitter's IRXF 1304. In turn, the IRXF 1304 provides the coded bits to layer 1 of the protocol stack associated with the transmitter's Supporting RAT '2' 1306. Once received, the Supporting RAT '2' 1305 appends an information element (IE) to the coded bits in step 1372. The Primary RAT '1' 1308 then transmits the coded bits in step 1374 over channel 1310 to layer 1 of the protocol stack associated with the receiver's Primary RAT '1' 1314. Likewise, the Supporting RAT '2' 1306 transmits the IE and the coded bits over channel 1310 to layer 1 of the protocol stack associated with the receiver's Supporting RAT '2' 1316 in step 1376.

If the coded bits received over layer 1 of the protocol stack associated with the receiver's Primary RAT '1' 1314 are incorrectly received, then a decision is made in step 1380 to not combine them with the IE and coded bits received over layer 1 of the protocol stack associated with the receiver's Secondary RAT '2' 1316. The receiver's IRXF 1318 then respectively sends acknowledgement (ACK) messages in steps 1382 and 1386 over layer 1 of the protocol stacks corresponding to the Primary RAT '1' 1314 and the Secondary RAT '2' 1316 associated with the receiver. In turn, an ACK message is respectively sent in steps 1384 and 1388 over the channel 1310 to layer 1 of the protocol stacks associated with the transmitter's Primary RAT '1' 1308 and Supporting RAT '2' 1306 over layer 1 of the protocol stacks corresponding to the receiver's Primary RAT '1' 1314 and the Secondary RAT '2' 1316.

In various embodiments, the erroneous reception may occur resulting in incorrectly received data. In these various embodiments, the data may require retransmission and various steps described in greater detail hereinabove may be repeated. Likewise, in these and other embodiments, a different application is implemented on radio '2', which serves as the Primary RAT. In these embodiments, extra error control bits received via the radio '1' interface are buffered and simultaneously transferred to the radio '2' interface for additional decoding.

It will be appreciated that the increased overall redundancy, as well as the use of independent wireless links, improves the robustness of the transmission closer to "five 9s" reliability. Likewise, repeating the process on the radio '2' interface and combining the data can further increase reliability. The system can likewise be configured to meet the desired increase in reliability and the embodiments described in greater detail herein can be extended across multiple RATs. It will likewise be appreciated by those of skill in the art that many embodiments are possible and the foregoing is not intended to limit the spirit scope or intent of the disclosure.

Skilled practitioners of the art will likewise recognize that the disclosure differs from prior art, which addresses MAC and IP layer coordination for all data with the introduction of a Generic Link Layer (GLL) protocol for cellular/WiFi operation. In contrast, the disclosure is applicable to collocated radios with dual, or multiple, active RATs operating in tandem or simultaneously. As described in greater detail herein, various embodiments implement an Information Element (IE) to indicate physical layer packets which have accompanying error control bits transmitted on an alternate RAT to provide multi-RAT coordination. In these various embodiments, the degree of resiliency can be controlled with co-ordination ranging from the use of a supporting RAT for transmission of error control bits via cross-RAT exchange, to additional transmission of full IP packets along with error control bits.

For example, in a Cognitive Radio System (CRS), the availability of multiple RAT protocol stacks in a device can be treated as a combination of PHY, MAC and higher layer resources that can be used to create a customized protocol stack to suit the application needs and to match with the available channel's conditions. In various embodiments, a supervisory layer is invoked at the appropriate level of the protocol stack, where layers 1-K are selected from a given RAT and layers L to the application layer can be mapped to another RAT through an inter-RAT Service Access Point (SAP). Accordingly, the device can operate on a specified RAT protocol stack matched to a given spectrum in a conventional manner or it can adaptively build a custom protocol stack combining the layers in the multiple RATs within it. In turn, the custom protocol stack can then be mapped to the application and the spectrum for opportunistic access using layers 1-K from a supporting RAT and higher layers above Layer K to application layer from the Primary RAT.

From the foregoing, those of skill in the art will recognize that known multi-RAT link layer approaches require changes to the link layer protocol in the participating RATs. Further, such approaches are applied in the same manner for every application or user data packet. In contrast, the IRSL disclosed herein is a lightweight overlay protocol that can be used with existing RATs. Furthermore, the IRSL may be conveniently implemented as a software instantiation that can be invoked for a chosen subset of data within an application, for a selected set of RATs, and for either the uplink or the downlink or both. Likewise, the IRXF disclosed herein is a lightweight function that does not require changes to the RAT protocol stack. Accordingly, the IRSL and IRXF can be applied flexibly based on a variety of criteria such as RAT end-point locations as well as application and data packet transmission reliability requirements. Furthermore, the operation of the IRSL in various embodiments is transparent to other layers of the communications system and thus it can be easily added to existing deployments. Nodes in a network can coexist that operate with and without the IRSL and IRXF. Moreover, the embodiments described in greater detail herein can likewise be applied to carrier aggregation, wherein multiple carriers implement the same RAT.

Although the described exemplary embodiments disclosed herein are described with reference to concurrently using a plurality of radio access technologies in a wireless-enabled communications environment to support a communications session, the present disclosure is not necessarily limited to the example embodiments which illustrate aspects of the present disclosure that are applicable to a wide variety of implementation algorithms. Thus, the particular embodiments disclosed above are illustrative only and should not be taken as limitations upon the present disclosure, as the disclosure may be modified and practiced in different but equivalent manners apparent to those skilled in the art having the benefit of the teachings herein. Accordingly, the foregoing description is not intended to limit the disclosure to the particular form set forth, but on the contrary, is intended to cover such alternatives, modifications and equivalents as may be included within the spirit and scope of the disclosure as defined by the appended claims so that those skilled in the art should understand that they can make various changes, substitutions and alterations without departing from the spirit and scope of the disclosure in its broadest form.

What is claimed is:

1. A network node, comprising:
   first and second communication links comprising, respectively, a first radio configured to use a first Radio Access Technology (RAT) and a second radio configured to use a second RAT;
   a first protocol stack corresponding to said first RAT, a second protocol stack corresponding to said second RAT;
   a processing logic configured to:
   use said first protocol stack to control the reception of a first set of transmitted data, said reception performed by said first radio;
   use said second protocol stack to control the reception of a second set of transmitted data, said reception performed by said second radio; and
   process said first and second sets of transmitted data to generate a set of received data, said second set of transmitted data comprising a subset of said first set of transmitted data.

2. The network node of claim 1, wherein said first set of received data comprises a first information element (IE) corresponding to said first set of transmitted data and said first RAT.

3. The network node of claim 2, wherein said second set of received data further comprises said first IE and a second IE corresponding to said second set of transmitted data and said second RAT.

4. The network node of claim 1, wherein said processing logic comprises a Network Inter-RAT Supervisory Layer (N-IRSL) configured to provide said first set of transmitted data to a predetermined layer of said first protocol stack and provide said second set of transmitted data to a predetermined layer of said second protocol stack.

5. The network node of claim 4, wherein said N-IRSL is configured to operate between the same layers of said first and second protocol stacks corresponding to a Device Inter-RAT Supervisory Layer (D-IRSL) in a client node.

6. The network node of claim 5, wherein said N-IRSL is configured to operate with a Network Inter-RAT eXchange Function (N-IRXF), said N-IRXF configured to allow the exchange of data between said first and second protocol stack.

7. The network node of claim 1, wherein said first and second RATs are different and are associated with the same communications provider.

8. The network node of claim 1, wherein said first and second RATs are different and are associated with different communications providers.

9. The network node of claim 1, wherein
said first RAT is a primary RAT comprising the complete protocol stack from the lowest physical layer to the highest application layer; and
said primary RAT is selected based on predefined parameters.

10. The network node of claim 1, wherein said second RAT is a supporting RAT comprising:
the protocol stack layers below a Network Inter-RAT Supervisory Layer (N-IRSL) corresponding to the second or supporting RAT; and
the protocol stack layers above IRSL corresponding to the first RAT.

11. The network node of claim 4, wherein said N-IRSL links the first RAT's higher layer with the corresponding lower layer for multiple RATs by associating a service access point for the higher layer of the first RAT with a service access point for the lower layer of the second RAT.

12. The network node of claim 4, wherein said N-IRSL maintains a table of active RATs in a client node.

13. The network node of claim 4, wherein said N-IRSL forwards received data to a higher layer of the first protocol stack.

14. The network node of claim 4, wherein said N-IRSL reorders data and discards duplicate priority data received from the subtending layer of the respective protocol stacks before conveying data to the higher layer of the first protocol stack.

15. The network node of claim 4, wherein said N-IRSL is configured to operate with a Inter RAT eXchange Function (N-IRXF), said N-IRXF configured to allow the exchange of bits between corresponding protocol layers of said first and second protocol stacks wherein:
the corresponding protocol layers comprise the link layer in the respective protocol stacks;
the corresponding protocol layers comprise the physical layer in the respective protocol stacks.

16. A method for managing the concurrent reception of data, comprising:
using an network node comprising a first radio configured to use a first Radio Access Technology (RAT) and a second radio configured to use a second RAT;
using a first protocol stack corresponding to said first RAT and a second protocol stack corresponding to said second RAT;
using a processing logic configured to:
use said first protocol stack to control the reception of a first set of transmitted data, said reception performed by said first radio;
use said second protocol stack to control the reception of a second set of transmitted data, said reception performed by said second radio; and
process said first and second sets of transmitted data to generate a set of received data, said second set of transmitted data comprising a subset of said first set of transmitted data.

17. The method of claim 16, wherein said first set of received data comprises a first information element (IE) corresponding to said first set of transmitted data and said first RAT.

18. The method of claim 17, wherein said second set of received data further comprises said first IE and a second IE corresponding to said second set of transmitted data and said second RAT.

19. The method of claim 16, wherein said processing logic comprises a Network Inter-RAT Supervisory Layer (N-IRSL) configured to provide said first set of transmitted data to a predetermined layer of said first protocol stack and provide said second set of transmitted data to a predetermined layer of said second protocol stack.

20. The method of claim 19, wherein said N-IRSL is configured to operate between the same layers of said first and second protocol stacks corresponding to a Device Inter-RAT Supervisory Layer (D-IRSL) in a client node.

21. The method of claim 20, wherein said N-IRSL is configured to operate with a Network Inter-RAT eXchange Function (N-IRXF), said N-IRXF configured to allow the exchange of data between said first and second protocol stack.

22. The method of claim 16, wherein said first and second RATs are different and are associated with the same communications provider.

23. The method of claim 16, wherein said first and second RATs are different and are associated with different communications providers.

24. The method of claim 16, wherein
said first RAT is a primary RAT comprising the complete protocol stack from the lowest physical layer to the highest application layer; and
said primary RAT is selected based on predefined parameters.

25. The method of claim 16, wherein said second RAT is a supporting RAT comprising:
the protocol stack layers below a Network Inter-RAT Supervisory Layer (N-IRSL) corresponding to the second or supporting RAT; and
the protocol stack layers above IRSL corresponding to the first RAT.

26. The method of claim 20, wherein said N-IRSL links the first RAT's higher layer with the corresponding lower layer for multiple RATs by associating a service access point for the higher layer of the first RAT with a service access point for the lower layer of the second RAT.

27. The method of claim 20, wherein said N-IRSL maintains a table of active RATs in a client node.

28. The method of claim 20, wherein said N-IRSL forwards received data to a higher layer of the first protocol stack.

29. The method of claim 20, wherein said N-IRSL reorders data and discards priority data received from the subtending layer of the respective protocol stacks before conveying data to the higher layer of the first protocol stack.

30. The method of claim 20, wherein said N-IRSL is configured to operate with a Inter RAT eXchange Function (N-IRXF), said N-IRXF configured to allow the exchange of bits between corresponding protocol layers of said first and second protocol stacks wherein:

the corresponding protocol layers comprise the link layer in the respective protocol stacks;
the corresponding protocol layers comprise the physical layer in the respective protocol stacks.

* * * * *